(12) United States Patent
Nagino

(10) Patent No.: US 11,620,545 B2
(45) Date of Patent: Apr. 4, 2023

(54) PLANNING APPARATUS, METHOD OF GENERATING OPERATING PLAN, HYDROGEN PRODUCTION METHOD, AND COMPUTER READABLE STORAGE MEDIUM

(71) Applicant: ASAHI KASEI KABUSHIKI KAISHA, Tokyo (JP)

(72) Inventor: Goshu Nagino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 432 days.

(21) Appl. No.: 16/827,726

(22) Filed: Mar. 24, 2020

(65) Prior Publication Data
US 2020/0226482 A1  Jul. 16, 2020

Related U.S. Application Data

(63) Continuation of application No. PCT/JP2018/034928, filed on Sep. 20, 2018.

(30) Foreign Application Priority Data

Sep. 25, 2017 (JP) .............................. JP2017-184037

(51) Int. Cl.
*G06N 5/04* (2023.01)
*G06N 20/00* (2019.01)
(Continued)

(52) U.S. Cl.
CPC ................. *G06N 5/04* (2013.01); *C25B 1/04* (2013.01); *C25B 15/02* (2013.01); *G06N 5/02* (2013.01); *G06N 20/00* (2019.01); *G06Q 50/06* (2013.01)

(58) Field of Classification Search
CPC . G06N 3/00–20/00; C25B 1/00–15/00; G06Q 10/00–50/00
(Continued)

(56) References Cited

U.S. PATENT DOCUMENTS 5,974,403 A * 10/1999 Takriti ................. H02J 3/008
702/180
8,600,571 B2 * 12/2013 Dillon ................... G06Q 10/04
700/291

(Continued)

FOREIGN PATENT DOCUMENTS

JP   H11272323 A   10/1999
JP   2001095044 A   4/2001

(Continued)

OTHER PUBLICATIONS

Internation Search Report and (ISA/237) Written Opinion of the International Search Authority for International Patent Application No. PCT/JP2018/034928, issued/mailed by the Japan Patent Office dated Dec. 18, 2018.

(Continued)

*Primary Examiner* — Alan S Miller

(57) ABSTRACT

The production cost of a product is reduced without reducing the production amount of a product of the electrolytic apparatus in a fixed period. There are provided a planning apparatus, a method of generating an operating plan, and a program, the planning apparatus including an electricity rate prediction unit that predicts a transition of a future electricity rate by using an electricity rate prediction model that predicts a transition of an electricity rate in a target period based on a value of a first factor available before the target period, and an operating plan generation unit that generates an (Continued)

operating plan of an electrolytic apparatus in a first period in a future based on a predicted transition of the future electricity rate.

19 Claims, 9 Drawing Sheets

(51) Int. Cl.
    *C25B 1/04*     (2021.01)
    *C25B 15/02*     (2021.01)
    *G06N 5/02*     (2023.01)
    *G06Q 50/06*     (2012.01)

(58) Field of Classification Search
    USPC .................................................. 706/1–900
    See application file for complete search history.

(56) References Cited

U.S. PATENT DOCUMENTS

| | | | |
|---|---|---|---|
| 2003/0182250 A1* | 9/2003 | Shihidehpour | G06Q 30/0202 705/7.31 |
| 2004/0073438 A1* | 4/2004 | Fox | G06Q 30/0283 705/400 |
| 2005/0165511 A1* | 7/2005 | Fairlie | H01M 8/0656 700/286 |
| 2008/0021675 A1* | 1/2008 | Fehr | G06Q 10/04 702/182 |
| 2009/0319090 A1* | 12/2009 | Dillon | G06Q 50/06 700/291 |
| 2010/0071889 A1* | 3/2010 | Radi | G05D 16/2013 165/286 |
| 2012/0065792 A1* | 3/2012 | Yonezawa | H02J 3/144 700/291 |
| 2013/0030784 A1* | 1/2013 | Viassolo | G06Q 10/00 703/18 |
| 2014/0058534 A1* | 2/2014 | Tiwari | G05B 13/04 700/9 |
| 2014/0188295 A1 | 7/2014 | Saito | |
| 2014/0365023 A1* | 12/2014 | Kiefhaber | G06Q 50/06 700/291 |
| 2016/0125339 A1* | 5/2016 | Itaya | G06Q 30/0202 705/7.25 |
| 2017/0315523 A1* | 11/2017 | Cross | G05B 17/02 |

FOREIGN PATENT DOCUMENTS

| | | |
|---|---|---|
| JP | 2003216697 A | 7/2003 |
| JP | 2016103082 A | 6/2016 |
| WO | 2017158762 A1 | 9/2017 |

OTHER PUBLICATIONS

Office Action issued for counterpart European Application 18859753.8, issued by the European Patent Office dated Sep. 8, 2020.

\* cited by examiner

PLANNING APPARATUS, METHOD OF GENERATING OPERATING PLAN, HYDROGEN PRODUCTION METHOD, AND COMPUTER READABLE STORAGE MEDIUM

The contents of the following Japanese patent application(s) are incorporated herein by reference:
NO. 2017-184037 filed in JP on Sep. 25, 2017, and
NO. PCT/JP2018/034928 filed on Sep. 20, 2018.

BACKGROUND

1. Technical Field

The present invention relates to a planning apparatus, a method of generating an operating plan, a hydrogen production method, and a computer readable storage medium.

2. Related Art

Conventionally, a hydrogen generator and the like that generate hydrogen by electrolyzing water are known. In addition, there is known a power supply system in which the rate fluctuates according to the cost of power supply such as weather and wind power.

DESCRIPTION OF EXEMPLARY EMBODIMENTS

Hereinafter, the present invention will be described through embodiments of the invention, but the following embodiments do not limit the invention according to the claims. Further, not all combinations of features described in the embodiments are essential to solving means of the invention.

Figure 1:
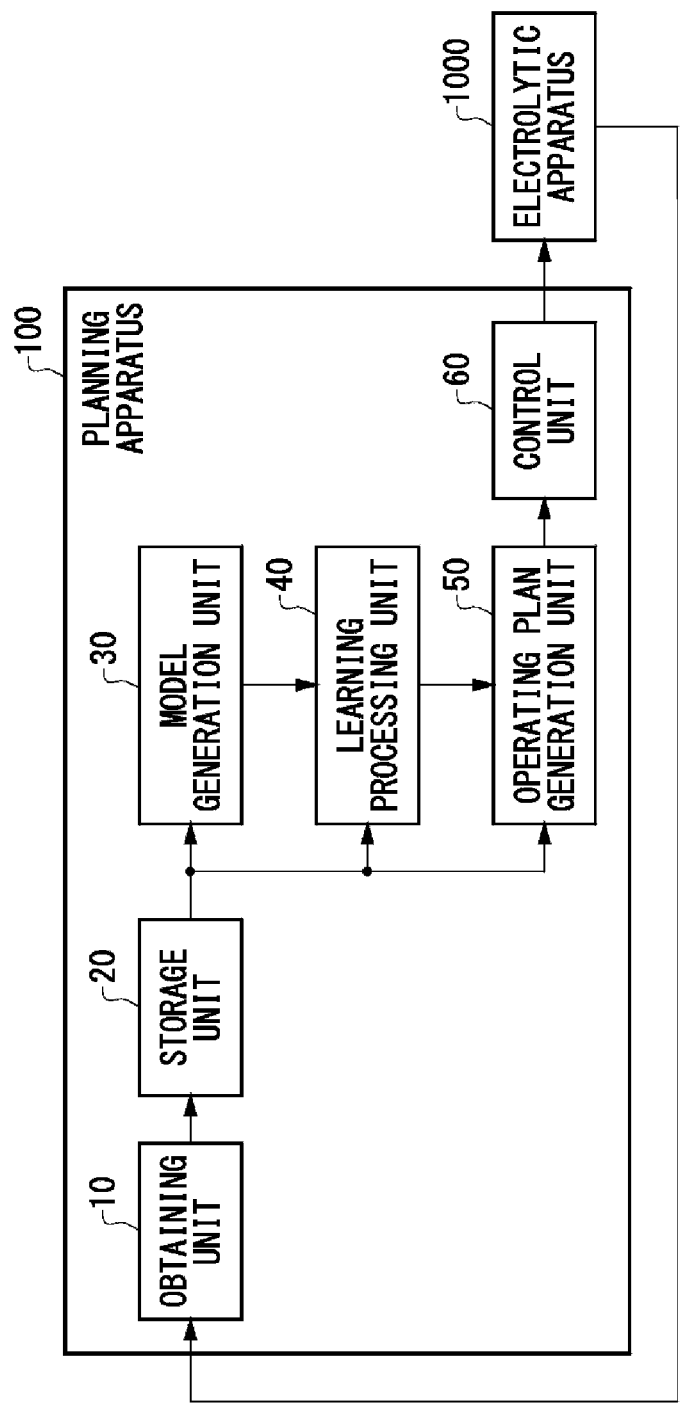
FIG. 1 illustrates a first configuration example of a planning apparatus 100 according to a present embodiment together with an electrolytic apparatus 1000.

FIG. 1 illustrates an exemplary configuration of a planning apparatus 100 according to the present embodiment, together with an electrolytic apparatus 1000. The planning apparatus 100 generates an operating plan of the electrolytic apparatus 1000 in a first period in the future by learning. The planning apparatus 100 controls the electrolytic apparatus 1000 according to the generated operating plan, and reduces a production cost for the electrolytic apparatus 1000 to produce a product. Note that the first period may be a predetermined period such as several days, ten-odd days, several weeks, or several tens of days, or the like.

Here, the electrolytic apparatus 1000 may be a device that uses electrical energy to generate a product. The electrolytic apparatus 1000 is, for example, a hydrogen generator that generates hydrogen by electrolysis. The operating plan generated by the planning apparatus 100 is, for example, a table or data, and the like describing a state that the electrolytic apparatus 1000 has to operate in the first period. The operating plan may be a table or data, and the like setting a time zone in which the electrolytic apparatus 1000 is operated (or not operated) and/or an operating rate of the electrolytic apparatus 1000 for each time zone. The planning apparatus 100 includes an obtaining unit 10, a storage unit 20, a model generation unit 30, a learning processing unit 40, an operating plan generation unit 50, and a control unit 60.

The obtaining unit 10 obtains parameters, learning data, and the like used for learning. The obtaining unit 10 obtains, for example, learning data including an ideal operating plan of the electrolytic apparatus 1000 in a predetermined target period in the future and values of factors available before the target period. The target period is a predetermined period in the future. The target period may be a period including the first period. The obtaining unit 10 may obtain, as a first factor, a parameter related to the electricity rate available before the target period. In addition, the obtaining unit 10 may obtain, as a second factor, a parameter related to the electrolytic apparatus 1000 available before the target period.

The obtaining unit 10 may be connected to the electrolytic apparatus 1000 or the like to obtain parameters and learning data used for learning. The obtaining unit 10 may be connected to a network or the like to obtain data via the network. When at least part of data to be obtained is stored in an external database or the like, the obtaining unit 10 may access the database or the like to obtain the data. In addition, the obtaining unit 10 may supply the obtained data to the storage unit 20.

The storage unit 20 stores information obtained by the obtaining unit 10. The storage unit 20 may be capable of storing data processed by the planning apparatus 100. The storage unit 20 may store intermediate data, calculation results, parameters, and the like calculated (or used) in the process of generating the operating plan by the planning apparatus 100. In addition, the storage unit 20 may supply stored data to a request source in response to a request from each unit in the planning apparatus 100. As an example, the storage unit 20 supplies stored data to the model generation unit 30 in response to a request from the model generation unit 30.

The model generation unit 30 generates a learning model that the planning apparatus 100 learns. The model generation unit 30 generates the learning model according to the first factor and the second factor. The model generation unit 30 may generate one or more learning models. The model generation unit 30 supplies the generated learning model to the learning processing unit 40.

The learning processing unit 40 learns the generated learning model based on the obtained learning data. The learning processing unit 40 may perform reinforcement learning to update the learning model. The learning processing unit 40 may update one or more learning models. The learning processing unit 40 supplies the updated learning model to the operating plan generation unit 50.

The operating plan generation unit 50 generates an operating plan of the electrolytic apparatus in the first period in the future. The operating plan generation unit 50 generates, for example, an operating plan that minimizes or reduces the production cost of a product to be produced while the electrolytic apparatus 1000 produces the product in the first period. The operating plan generation unit 50 supplies the generated operating plan to the control unit 60.

The control unit 60 performs control of operating the electrolytic apparatus 1000 by using the operating plan of the electrolytic apparatus 1000 in the first period. The control unit 60 may cause each of a plurality of electrolytic apparatuses 1000 to operate. In addition, when operations of the electrolytic apparatus 1000, the storage amount of a generation unit, and the like fall within a range different from an assumption, the control unit 60 may instruct stop and start of operation of the electrolytic apparatus 1000. In addition, the control unit 60 may instruct stop and start of operation of the electrolytic apparatus 1000 when the electricity rate greatly fluctuates.

According to the planning apparatus 100 of the present embodiment as above, an operating plan of the electrolytic apparatus 1000 according to fluctuations in electricity rates can be generated, and the product of a predetermined amount or more can be generated at a lower production cost. Next, a more specific configuration example of such a planning apparatus 100 will be described.

Figure 2:
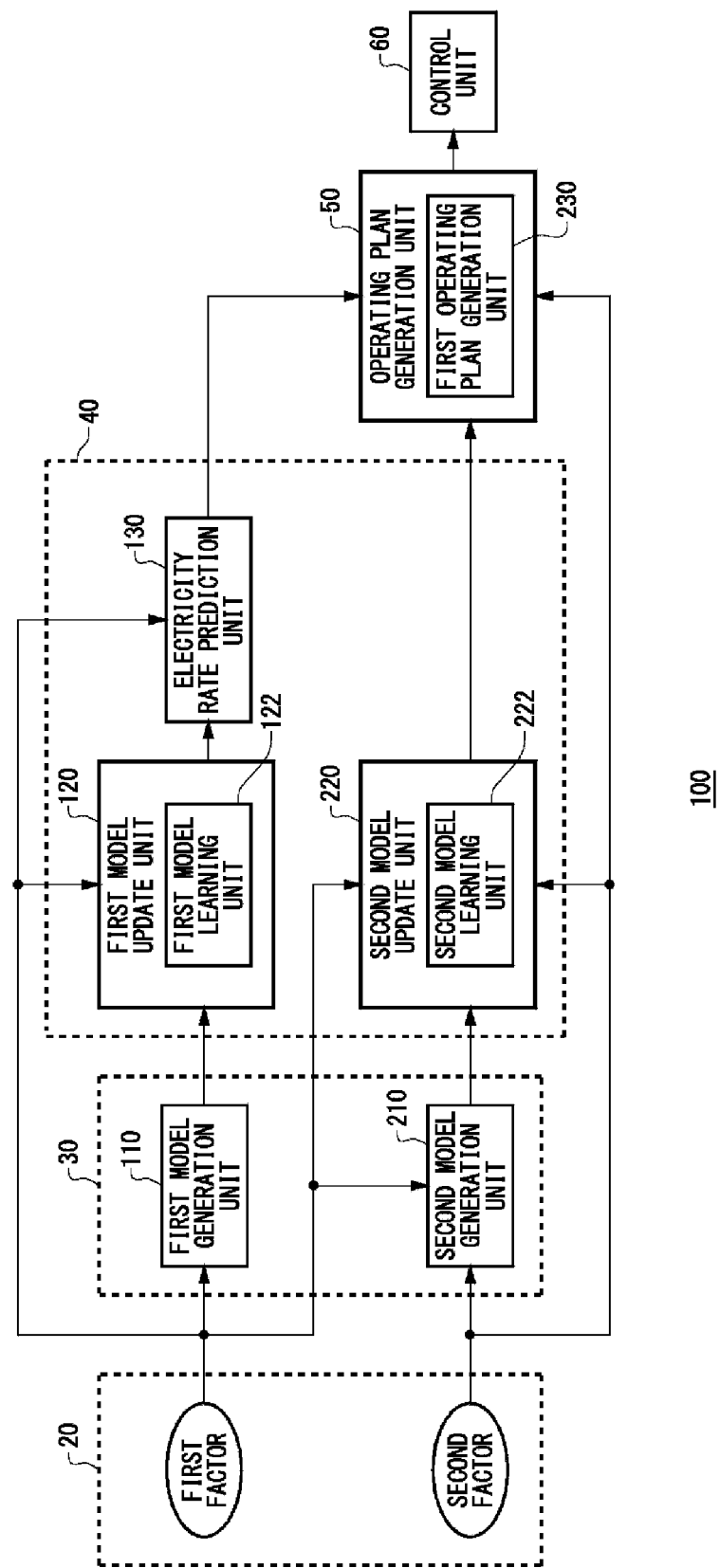
FIG. 2 illustrates a second configuration example of the planning apparatus 100 according to the present embodiment.

FIG. 2 illustrates a second configuration example of the planning apparatus 100 according to the present embodiment. In the planning apparatus 100 of the second configuration example, the same reference numerals are given to components substantially the same in operation as those of the planning apparatus 100 according to the present embodiment illustrated in FIG. 1, and descriptions thereof will be omitted. Note that FIG. 2 illustrates a configuration in which the obtaining unit 10 of the planning apparatus 100 is omitted.

The planning apparatus 100 of the second configuration example includes a first model generation unit 110, a first model update unit 120, and an electricity rate prediction unit 130, and predicts a transition of a future electricity rate. Further, the planning apparatus 100 of the second configuration example includes a second model generation unit 210, a second model update unit 220, and a first operating plan generation unit 230, and generates a future operating plan of the electrolytic apparatus 1000 based on the predicted transition of the electricity rate. In this case, the model generation unit 30 may have the first model generation unit 110 and the second model generation unit 210, and the learning processing unit 40 may have the first model update unit 120, the electricity rate prediction unit 130, and the second model update unit 220.

The storage unit 20 of the second configuration example stores the first factor and the second factor obtained by the obtaining unit 10. The first factor includes at least one of an electricity rate, a power demand amount, a power supply amount, a regenerated energy generation amount, a predicted value of the regenerated energy generation amount, and weather information before the target period. The electricity rate may be an actual electricity rate for power supplied to the electrolytic apparatus 1000 at the place where the electrolytic apparatus 1000 is installed. The power demand amount, the power supply amount, the regenerated energy generation amount, and the predicted value of the regenerated energy generation amount may be information of a power plant or the like that supplies electric power to the area where the electrolytic apparatus 1000 is installed. The weather information may be information of the area where the electrolytic apparatus 1000 is installed.

The first factor may include, in addition to information of past electricity rates, information that affects the electricity rates for power consumed by the electrolytic apparatus 1000. The first factor may be time-series information at approximately constant time intervals. Further, the first factor may include various types of information in different time periods. Moreover, the first factor may include information supplied from an external device or the like.

The second factor includes at least one of operating data of the electrolytic apparatus 1000 and a hydrogen storage amount of the electrolytic apparatus 1000 before the target period. Further, the second factor may include an operating plan of the electrolytic apparatus 1000 that is generated by the planning apparatus 100 in the past. Moreover, the second factor may include virtual data calculated from a physical model of the electrolytic apparatus 1000. The second factor may be time-series information at approximately constant time intervals. Further, the second factor may include information obtained by the obtaining unit 10 from the electrolytic apparatus 1000.

The information of the first factor and the second factor may be added or updated as time passes. For example, the obtaining unit 10 may obtain and update each information every predetermined period. Further, the obtaining unit 10 may obtain information every substantially the same or different period according to information to be obtained, and may add or update each information.

The first model generation unit 110 generates an electricity rate prediction model that predicts a transition of the electricity rate in a target period based on a value of the first factor prior to the target period. The first model generation unit 110 may generate the electricity rate prediction model by a process called prior learning, offline learning, or the like using information before the target period. The first model generation unit 110 generates the electricity rate prediction model by using, for example, regression analysis, Bayesian inference, a neural network, a Gaussian mixture model, a hidden Markov model, and the like. The first model generation unit 110 supplies the generated electricity rate prediction model as a first model to the first model update unit 120.

The first model update unit 120 updates the electricity rate prediction model by learning. The first model update unit 120 has a first model learning unit 122, and updates the electricity rate prediction model according to a learning result of the first model learning unit 122. The first model update unit 120 may update, for example, the electricity rate prediction model learned by the first model learning unit 122 as a new electricity rate prediction model every predetermined first update period. Instead of this, the first model update unit 120 may update the electricity rate prediction model in response to the first model learning unit 122 having learned a predetermined number of times.

The first model learning unit 122 may learn the electricity rate prediction model by a process called adaptive learning, online learning, or the like. The first model learning unit 122 learns the electricity rate prediction model by performing reinforcement learning using, for example, regression analysis, Bayesian inference, a neural network, a Gaussian mixture model, and a hidden Markov model, and the like as an identification model. It is desirable that the first model learning unit 122 learn by further using information temporally after information of the first factor used by the first model generation unit 110 for generating the electricity rate prediction model.

That is, the first model learning unit 122 learns the electricity rate prediction model using the information of the first factor updated with a transition of the actual electricity rate. The first model learning unit 122 may perform learning of the electricity rate prediction model in response to the information of the first factor being updated. As an example, the first model learning unit 122 learns the electricity rate prediction model based on a value of the first factor in a past period and an actual transition of the electricity rate after the past period. The first model learning unit 122 performs learning one or more times during the first update period of the first model update unit 120. The first model update unit 120 supplies the updated electricity rate prediction model to the electricity rate prediction unit 130.

The electricity rate prediction unit 130 predicts a transition of a future electricity rate using the updated electricity rate prediction model. The electricity rate prediction unit 130 predicts, every predetermined period for example, an electricity rate for the predetermined period in the future. The electricity rate prediction unit 130 predicts the electricity rate by using the electricity rate prediction model and the information of the first factor. The electricity rate prediction unit 130 applies, for example, the information of the first factor in the period until a time immediately before a period for which the electricity rate is to be predicted to the electricity rate prediction model, so as to predict the electricity rate. The electricity rate prediction unit 130 supplies a prediction result to the operating plan generation unit 50.

The second model generation unit 210 generates an operating plan generation model based on a value of the second factor prior to the target period and a transition of the electricity rate. The operating plan generation model is a model that generates an operating plan of the electrolytic apparatus 1000 in the target period by learning based on a value of the second factor before the target period and a prediction result of a transition of the electricity rate in the target period. Note that the second model generation unit 210 may use a value of the first factor as a transition of the electricity rate in the past. The second model generation unit 210 may generate the operating plan generation model by learning processing called prior learning, offline learning, or the like by using information before the target period.

The second model generation unit 210 generates the operating plan generation model by performing reinforcement learning using, for example, regression analysis, Bayesian inference, a neural network, a Gaussian mixture model, a hidden Markov model, and the like as an identification model. The second model generation unit 210 supplies the generated operating plan generation model as a second model to the second model update unit 220.

The second model update unit 220 updates the operating plan generation model by learning. The second model update unit 220 has a second model learning unit 222, and updates the operating plan generation model according to a learning result of the second model learning unit 222. For example, the second model update unit 220 may update, for example, the operating plan generation model learned by the second model learning unit 222 as a new operating plan generation model every predetermined second update period. Instead of this, the second model update unit 220 may update the operating plan generation model in response to the second model learning unit 222 having learned a predetermined number of times.

The second model learning unit 222 may learn the operating plan generation model by a process called adaptive learning, online learning, or the like. The second model learning unit 222 learns the operating plan generation model by performing reinforcement learning using, for example, regression analysis, Bayesian inference, a neural network, a Gaussian mixture model, a hidden Markov model, and the like as an identification model. It is desirable that the second model learning unit 222 learn by further using information temporally after information of the second factor used by the second model generation unit 210 for generating the operating plan generation model.

That is, the second model learning unit 222 may learn the operating plan generation model using the information of the first factor updated with the transition of the actual electricity rate and the information of the second factor updated by actual operation of the electrolytic apparatus 1000. In addition, regarding the transition of the electricity rate, for example, the prediction result of the electricity rate prediction unit 130 may be used instead of the transition of the actual electricity rate. That is, the second model learning unit 222 learns the operating plan generation model based on a value of the second factor in a past period and a transition of the electricity rate or a prediction result of the transition of the electricity rate after the past period.

The second model learning unit 222 may perform learning of the operating plan generation model in response to the information of the second factor being updated. The second model learning unit 222 performs learning one or more times during the second update period of the second model update unit 220. The second model update unit 220 supplies the updated operating plan generation model to the operating plan generation unit 50.

The operating plan generation unit 50 generates an operating plan of the electrolytic apparatus 1000 in the first period in the future based on the transition of the future electricity rate predicted by the electricity rate prediction unit 130. The operating plan generation unit 50 has a first operating plan generation unit 230.

The first operating plan generation unit 230 generates an operating plan of the electrolytic apparatus 1000 in the first period in the future by using an operating plan generation model that generates an operating plan in the target period based on a value of the second factor available before the target period and a prediction result of the transition of the electricity rate in the target period. The first operating plan generation unit 230 generates an operating plan of the electrolytic apparatus 1000, for example, with a period of several days or ten-odd days, or one or several weeks being the first period. The first operating plan generation unit 230 generates, for example, an operating plan for N days.

The control unit 60 causes the electrolytic apparatus 1000 to operate according to the operating plan generated by the operating plan generation unit 50. In addition, the control unit 60 may control the electrolytic apparatus 1000 so that the obtaining unit 10 can obtain information of the second factor that fluctuates due to operating of the electrolytic apparatus 1000.

Figure 3:
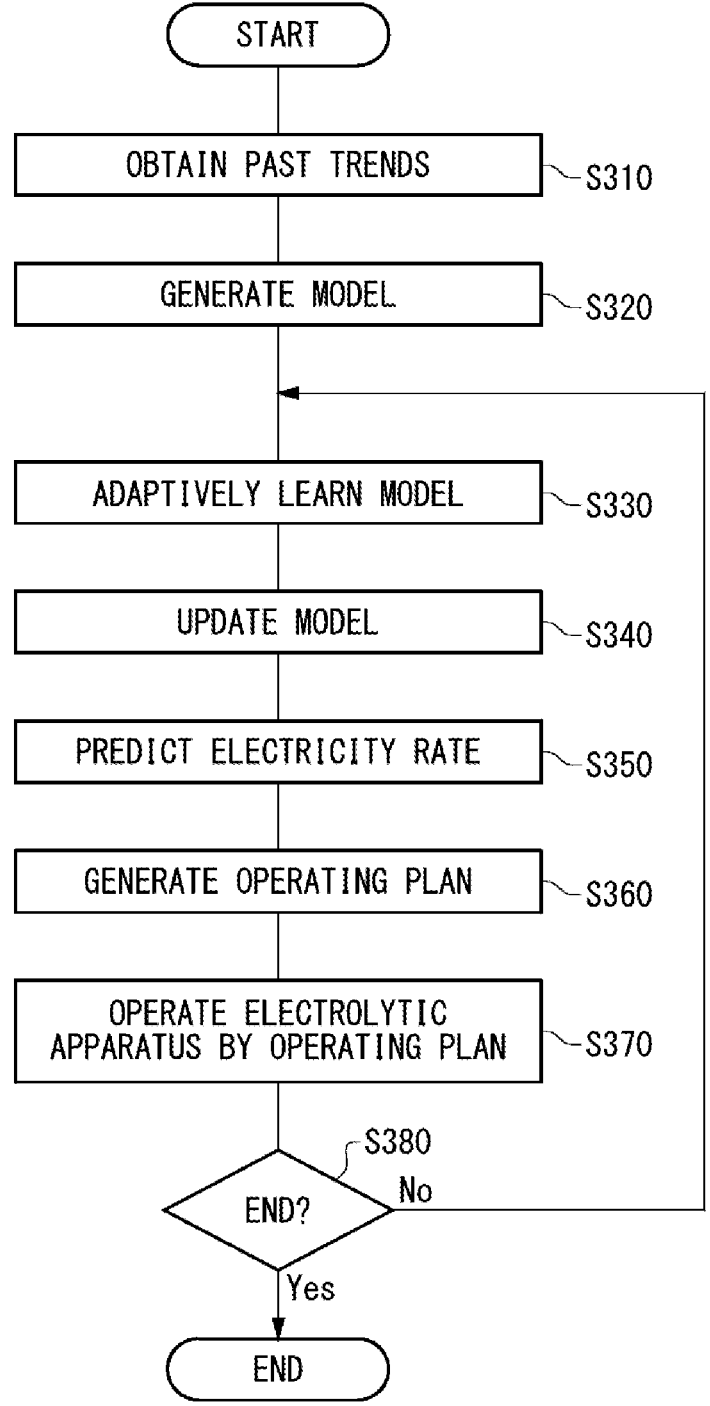
FIG. 3 illustrates an example of an operating flow of the planning apparatus 100 of the second configuration example according to the present embodiment.

The planning apparatus 100 according to the present embodiment as above generates an operating plan of the electrolytic apparatus 1000 by learning. Further, the planning apparatus 100 generates the operating plan of the electrolytic apparatus 1000 while predicting the electricity rate by learning. Operations of such a planning apparatus 100 will now be described. FIG. 3 illustrates an example of an operating flow of the planning apparatus 100 of the second configuration example according to the present embodiment. The planning apparatus 100 may execute the operating flow illustrated in FIG. 3 to cause the electrolytic apparatus 1000 to operate.

First, the obtaining unit 10 obtains information of the first factor and the second factor which are past trends of the electricity rate and the electrolytic apparatus 1000 (S310). The obtaining unit 10 obtains information of the first factor and the second factor, for example, from time t0 to time t1. Here, a period between time t0 and time t1 is a second period before a first period. The obtaining unit 10 stores the obtained information of the first factor and the second factor in the storage unit 20. In addition, the obtaining unit 10 may supply information of the first factor and the second factor to the model generation unit 30.

Next, the model generation unit 30 generates a learning model (S320). The model generation unit 30 generates the learning model based on values of the first factor and the second factor of the second period. For example, the first model generation unit 110 generates an electricity rate prediction model based on the value of the first factor. The first model generation unit 110 generates the electricity rate prediction model by using at least one of an electricity rate, a power demand amount, a power supply amount, a regenerated energy generation amount, a predicted value of the regenerated energy generation amount, and weather information in the second period.

Further, the second model generation unit 210 generates an operating plan generation model based on values of the first factor and the second factor. For example, the second model generation unit 210 generates the operating plan generation model by using at least one of the electricity rate, operating data of the electrolytic apparatus 1000, the hydrogen storage amount, and virtual data of the operating plan in the second period.

In addition, the second model generation unit 210 may generate the operating plan generation model by setting virtual data based on a physical model of the electrolytic apparatus 1000 as ideal prediction data, and comparing the predicted data with actual data obtained by past operation of the electrolytic apparatus 1000. For example, the second model generation unit 210 generates the operating plan generation model by performing reinforcement learning so that the difference between ideal prediction data and actual data in the past is 0 or less than a predetermined value.

As an example, the second model generation unit 210 sets a period of M days in the second period as a virtual prediction period. Note that M days may be, for example, a period such as several days or ten-odd days, or one or several weeks. It is desirable that M days coincide with the first period (N days). Then, the second model generation unit 210 performs reinforcement learning so that an error is minimized between a prediction result of an operating action in the prediction period based on values of the first factor and the second factor in the period before the prediction period in the second period and actual data or virtual data in the prediction period.

In this case, the second model generation unit 210 may perform reinforcement learning so as to reduce hydrogen generation cost while satisfying conditions such that a fluctuation range of a hydrogen storage amount is a range from 0 to a maximum storage amount (first condition), the amount of hydrogen generated and supplied by the electrolytic apparatus 1000 satisfies a predetermined supply plan (second condition), the electrolytic apparatus 1000 is operated by selecting a time zone in which the electricity cost is low (third condition), and the like. Note that such generation of a learning model by the model generation unit 30 may be performed before the planning apparatus 100 obtains actual data of the electrolytic apparatus 1000 accompanying with operation of the electrolytic apparatus 1000.

Next, the learning processing unit 40 adaptively learns the generated learning model (S330). Here, the obtaining unit 10 may obtain information of the first factor and the second factor. The obtaining unit 10 obtains information of the first factor and the second factor, for example, from time t1 to time t2. Note that a period between time t1 and time t2 is a third period between the first period and the second period. The learning processing unit 40 may perform adaptive learning using information of the first factor and the second factor newly obtained by the obtaining unit 10.

For example, the first model learning unit 122 adaptively learns the electricity rate prediction model based on a value of the first factor. The first model learning unit 122 may adaptively learn the electricity rate prediction model by using at least one of an electricity rate, a power demand amount, a power supply amount, a regenerated energy generation amount, a predicted value of the regenerated energy generation amount, and weather information in the third period. The first model learning unit 122 may perform reinforcement learning so that a result of predicting the electricity rate and the like in the third period by using the electricity rate prediction model matches the obtained electricity rate of the third period.

As an example, the first model learning unit 122 sets a period of M days in the third period as a virtual prediction period. Note that M days may be, for example, a period such as several days or ten-odd days, or one or several weeks. It is desirable that M days coincide with the first period (N days). As an example, the first model learning unit 122 performs reinforcement learning so that the difference between a prediction result of the prediction period based on a value of the first factor of a period before the prediction period in the third period and actual data of the prediction period is 0 or less than a predetermined value.

Note that the regenerated energy generation amount out of the information of the first factor is energy generated after power is supplied. For example, the regenerated energy generation amount according to the power supply amount at one time is information at a time shifted after the one time. Accordingly, the first model learning unit 122 may predict the electricity rate or the like of the prediction period by using a value of the first factor excluding the regenerated energy generation amount in a period before the prediction period in the third period, and a predicted value of the regenerated energy generation amount in the prediction period. Thus, the first model learning unit 122 may adjust data to be used and a period for prediction according to actual obtaining timing of each data, so as to improve accuracy of learning.

Further, the second model learning unit 222 may apply and learn the operating plan generation model based on values of the first factor and the second factor. For example, the second model learning unit 222 may learn the operating plan generation model by using at least one of an electricity rate, operating data of the electrolytic apparatus 1000, a hydrogen storage amount, and actual data of operating plan in the third period. The second model learning unit 222 may perform reinforcement learning so that the difference between a prediction result of an operating action of the electrolytic apparatus 1000 in the third period predicted by using the operating plan generation model and obtained actual data of the third period is 0 or less than a predetermined value.

As an example, the second model learning unit 222 sets a period of M days in the third period as a virtual prediction period. Note that M days may be, for example, a period such as several days or ten-odd days, or one or several weeks. It is desirable that M days coincide with the first period (N days). Then, the second model learning unit 222 performs reinforcement learning so that the difference between a prediction result of an operating action of the prediction period based on values of the first factor and the second factor of a period prior to the prediction period in the third period and actual data of the prediction period is 0 or less than a predetermined value.

In this case, the second model learning unit 222 may similarly use the first condition, the second condition, the third condition, and the like used by the second model generation unit 210 for generating the operating plan generation model. That is, the second model learning unit 222 may perform reinforcement learning of the operating plan generation model so as to reduce the hydrogen generation cost while satisfying the three conditions.

Next, the learning processing unit 40 updates the learning model (S340). The learning processing unit 40 may update the learning model every predetermined time. For example, the learning processing unit 40 continues adaptive learning only for an initial update period necessary for the update after starting the adaptive learning, and then executes a first update of the learning model, and thereafter repeats the update every fixed period. Here, it is desirable that the initial update period is N days or more, which is the period of the operating plan to be generated. In addition, the fixed period of repeating the update may be several hours, ten-odd hours, one day, several tens of hours, or several days, or the like.

For example, after the initial update period, the first model update unit 120 updates the electricity rate prediction model every first update period. In addition, after the initial update period, the second model update unit 220 updates the operating plan generation model every second update period. The first update period and the second update period may be different periods, or may be substantially the same period instead. As an example, the first update period and the second update period are one day.

Next, the learning processing unit 40 predicts the electricity rate using the updated learning model (S350). For example, the electricity rate prediction unit 130 predicts a transition of the electricity rate in the first period using the updated electricity rate prediction model and a value of the first factor. As an example, the electricity rate prediction unit 130 applies values of the first factor for N days obtained by the obtaining unit 10 during the initial update period to the electricity rate prediction model, so as to predict a transition of the electricity rate for N days after the initial update period.

Next, the operating plan generation unit 50 generates an operating plan of the electrolytic apparatus 1000 in the first period by using the updated learning model (S360). For example, the first operating plan generation unit 230 generates an operating plan of the first period by using the updated operating plan generation model, a prediction result of the electricity rate of the electricity rate prediction unit 130, and a value of the first factor. As an example, the first operating plan generation unit 230 applies values of the second factor for N days obtained by the obtaining unit 10 during the initial update period and a prediction result of the transition of the electricity rate for N days after the initial update period to the operating plan generation model, so as to generate an operating plan for N days after the initial update period.

The first operating plan generation unit 230 may similarly use the first condition, the second condition, and the third condition, and the like used by the second model generation unit 210 for generating the operating plan generation model. That is, the first operating plan generation unit 230 may generate an operating plan for reducing the hydrogen generation cost while satisfying the three conditions. It is desirable that the first operating plan generation unit 230 generate an operating plan that minimizes the hydrogen generation cost.

For example, the first operating plan generation unit 230 generates an operating plan including a period in which the electrolytic apparatus 1000 is operated and a period in which the electrolytic apparatus 1000 is not operated in the first period. In addition, the first operating plan generation unit 230 may generate an operating plan indicating the period in which the electrolytic apparatus 1000 is operated together with an operating rate. It is desirable that the first operating plan generation unit 230 generate an operating plan in which the operating rate changes in time series. The first operating plan generation unit 230 generates, for example, an operating plan for every fixed time. The first operating plan generation unit 230 may generate an operating plan of every several minutes, one hour, or several hours.

Further, when the control unit 60 controls a plurality of electrolytic apparatuses 1000, the first operating plan generation unit 230 may generate an operating plan for each of the plurality of electrolytic apparatuses 1000. When the plurality of electrolytic apparatuses 1000 are substantially the same electrolytic apparatuses, the first operating plan generation unit 230 may generate substantially the same operating plan for each of them. In addition, when the control unit 60 controls a plurality of electrolytic apparatuses 1000 including different types of electrolytic apparatuses, electrolytic apparatuses purchased at different times, electrolytic apparatuses of different manufacturers, or a combination thereof, the first operating plan generation unit 230 may generate different operating plans corresponding to the respective electrolytic apparatuses 1000.

In this case, the second model generation unit 210 may generate a plurality of operating plan generation models respectively corresponding to every number of apparatuses to operate among the plurality of electrolytic apparatuses 1000 or every combination of the plurality of electrolytic apparatuses. Also, the second model learning unit 222 may learn each of the plurality of operation generation models, and the second model update unit 220 may update each of the plurality of operation generation models. The first operating plan generation unit 230 may use the operating plan generation model according to an operating plan of the plurality of electrolytic apparatuses 1000 in the first period among the plurality of operating plan generation models, so as to generate an operating plan of the electrolytic apparatuses in the first period. Here, an operating schedule may be a predetermined hydrogen supply plan to be satisfied by the electrolytic apparatus 1000.

The control unit 60 causes the electrolytic apparatus 1000 to operate for N days using the operating plan generated by the operating plan generation unit 50 (S370). In this manner, the electrolytic apparatus 1000 can operate to reduce the hydrogen generation cost while satisfying the predetermined hydrogen supply plan in the first period.

When the planning apparatus 100 continues operation of the electrolytic apparatus 1000 after the first period (No in S380), the process returns to S330, and the learning processing unit 40 performs adaptive learning of the learning model. In this case, the obtaining unit 10 sequentially obtains information of the first factor in the first period and information of the second factor that changes due to operation of the electrolytic apparatus 1000 in the first period, and sequentially stores the information in the storage unit 20. That is, the planning apparatus 100 includes information of the first period in the past information, and sets the target period to be predicted as a period after the first period (for example, a fourth period).

Then, the planning apparatus 100 repeats the adaptive learning of the model using the information of the first period, updates the model according to the elapse of a fixed period, generates an operating plan of the electrolytic apparatus 1000 of the fourth period, and causes the electrolytic apparatus 1000 to operate according to the operating plan. As described above, the planning apparatus 100 according to the present embodiment can continually operate the electrolytic apparatus 1000 while updating the learning model by repeating generation of an operating plan of the target period of the electrolytic apparatus 1000 and operation in the target period.

In the operating flow of the planning apparatus 100 as above, an example has been described in which the planning apparatus 100 is operated in time series in the order of the second period, the third period, the first period, and the fourth period. Here, the second period, the third period, the first period, and the fourth period may be temporally continuous in this order. It is desirable that at least the first period and the fourth period be continuous periods.

It has been stated that the planning apparatus 100 according to the present embodiment as above generates an operating plan by learning according to a transition of the electricity rate, an operating state of the electrolytic apparatus 1000, and the like. Here, it is desirable to periodically maintain the electrolytic apparatus 1000 in order to prevent the operation from being stopped due to an abnormal operation and a failure. In this case, the electrolytic apparatus 1000 may stop for a certain period according to maintenance or the like, and the operating state may fluctuate. Therefore, the planning apparatus 100 may perform learning in consideration of fluctuations in the operating state due to maintenance or the like. Such a planning apparatus 100 will be described next.

Figure 4:
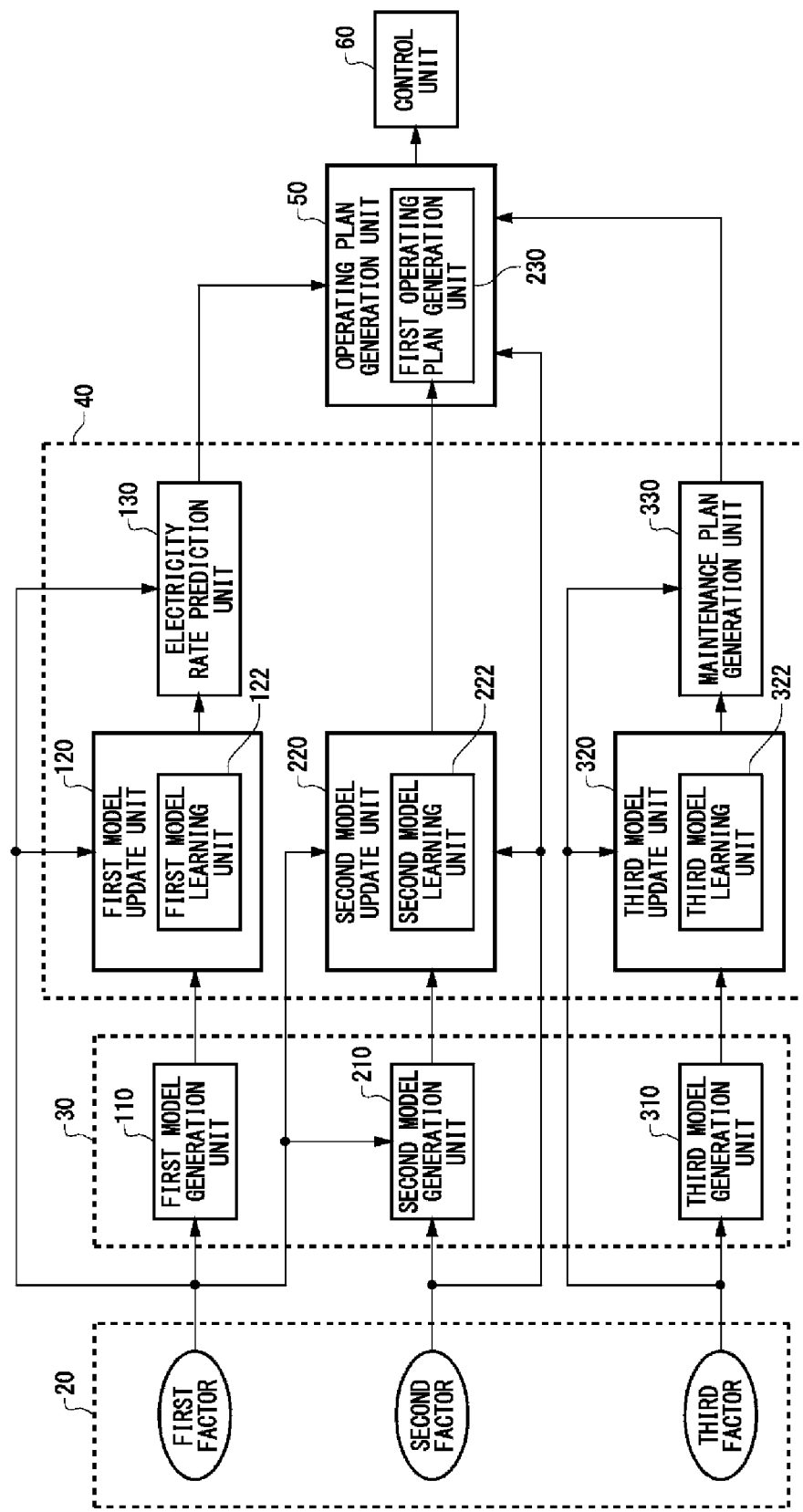
FIG. 4 illustrates a third configuration example of the planning apparatus 100 according to the present embodiment.

FIG. 4 illustrates a third configuration example of the planning apparatus 100 according to the present embodiment. In the planning apparatus 100 of the third configuration example, the same reference numerals are given to components substantially the same in operation as those of the planning apparatus 100 of the second configuration example illustrated in FIG. 2, and descriptions thereof will be omitted. Moreover, FIG. 4 illustrates a configuration in which the obtaining unit 10 of the planning apparatus 100 is omitted.

The planning apparatus 100 of the third configuration example includes a third model generation unit 310, a third model update unit 320, and a maintenance plan generation unit 330, and predicts a transition of the operating state due to maintenance of the electrolytic apparatus 1000 in the future. In this case, the model generation unit 30 may have the third model generation unit 310, and the learning processing unit 40 may have the third model update unit 320 and the maintenance plan generation unit 330.

In the storage unit 20 of the third configuration example, the obtaining unit 10 further obtains the third factor and stores the third factor in the storage unit 20. The third factor may include a past maintenance plan of the electrolytic apparatus 1000. The third factor may include information of disposition of personnel who can perform maintenance, equipment, replacement parts, and the like. Further, the third factor may include information such as a time, a period, and a content when the electrolytic apparatus 1000 performed maintenance in the past, a change in operating rate of the electrolytic apparatus 1000 due to maintenance, and the like.

In addition, in the planning apparatus 100 of the third configuration example, the obtaining unit 10 may obtain prediction data predicting abnormality and deterioration of the electrolytic apparatus 1000 from the outside or the like and store the data in the storage unit 20 as information of the third factor. In this case, the prediction data may predict that the next abnormality and deterioration will occur in a period equivalent to a past period from operation of the electrolytic apparatus 1000 to occurrence of abnormality and deterioration. Moreover, regarding the prediction data, a history of abnormality and degradation obtained as a result of operating different electrolytic apparatuses 1000 of the same type may be used as the prediction data of the electrolytic apparatus 1000.

The third model generation unit 310 generates a maintenance plan generation model based on a value of the third factor available before the target period. The third model generation unit 310 may generate a maintenance plan generation model by a process called prior learning, offline learning, or the like using information before the target period.

The third model generation unit 310 generates the maintenance plan generation model by performing reinforcement learning using, for example, regression analysis, Bayesian inference, a neural network, a Gaussian mixture model, a hidden Markov model, and the like as an identification model. Note that the maintenance plan generation model is a model that generates a maintenance plan including disposition of personnel performing maintenance, schedule of maintenance, content of maintenance, operating rate of the electrolytic apparatus 1000, and the like by learning.

For example, when abnormality or deterioration is predicted in a predetermined period, the third model generation unit 310 performs reinforcement learning to generate a maintenance plan generation model so as to start or complete maintenance before the date and time at which the abnormality or deterioration occurs. Note that a plan for starting or completing maintenance according to the prediction of abnormality and deterioration is set as an ideal maintenance plan of the electrolytic apparatus 1000.

For example, the third model generation unit 310 may generate a maintenance plan generation model in the operation of S320 described in FIG. 3. That is, the third model generation unit 310 generates the maintenance plan generation model based on the value of the third factor of the second period. The third model generation unit 310 supplies the generated maintenance plan generation model as a third model to the third model update unit 320.

The third model update unit 320 updates the maintenance plan generation model by learning. The third model update unit 320 has a third model learning unit 322, and updates the maintenance plan generation model according to a learning result of the third model learning unit 322. For example, the third model update unit 320 may update the maintenance plan generation model learned by the third model learning unit 322 as a new maintenance plan generation model every predetermined third update period. Instead of this, the third model update unit 320 may update the maintenance plan generation model in response to the third model learning unit 322 having learned a predetermined number of times.

The third model learning unit 322 may learn the maintenance plan generation model by a process called adaptive learning, online learning, or the like. The third model learning unit 322 performs reinforcement learning of the maintenance plan generation model using, for example, regression analysis, Bayesian inference, a neural network, a Gaussian mixture model, a hidden Markov model, and the like as an identification model. It is desirable that the third model learning unit 322 learn by further using information temporally after information of the third factor used by the third model generation unit 310 for generating the maintenance plan generation model.

The third model learning unit 322 learns the maintenance plan generation model using information of the third factor updated by actual operation of the electrolytic apparatus 1000. That is, the third model learning unit 322 learns the maintenance plan generation model based on a value of the third factor in a past period and the ideal maintenance plan of the electrolytic apparatus 1000 after the past period.

The third model learning unit 322 may perform learning of the maintenance plan generation model in response to the information of the third factor being updated. The third model learning unit 322 performs learning one or more times during the third update period of the third model update unit 320. As an example, the third model generation unit 310 may adaptively learn the maintenance plan generation model in the operation of S330 described in FIG. 3 and update the maintenance plan generation model in the operation of S340.

For example, the third model update unit 320 updates the maintenance plan generation model every third update period after the initial update period described in FIG. 3. The third update period and the first update period may be different periods, or may be substantially the same period instead. As an example, the third update period is one day. The third model update unit 320 supplies the updated maintenance plan generation model to the maintenance plan generation unit 330.

The maintenance plan generation unit 330 generates a maintenance plan of the electrolytic apparatus 1000 in the first period in the future by using the updated maintenance plan generation model. The maintenance plan generation unit 330 generates the maintenance plan of the electrolytic apparatus in the first period based on a value of the third factor including abnormality prediction of the electrolytic apparatus 1000 in the first period.

The maintenance plan generation unit 330 generates, every predetermined period for example, a maintenance plan for the predetermined period in the future. The maintenance plan generation unit 330 applies, for example, the information of the third factor in the period until a time immediately before the start of the future predetermined period to the maintenance plan generation model, so as to generate the maintenance plan. The maintenance plan generation unit 330 may generate a maintenance plan in the operation of S350 described in FIG. 3 as an example.

In this case, the maintenance plan generation unit 330 applies values of the third factor for N days obtained by the obtaining unit 10 during the initial update period to the maintenance plan generation model, so as to generate a maintenance plan of N days of the first period after the initial update period. The maintenance plan generation unit 330 supplies the generated maintenance plan to the operating plan generation unit 50.

The operating plan generation unit 50 of the third configuration example generates an operating plan of the electrolytic apparatus 1000 in the first period further based on the maintenance plan of the electrolytic apparatus 1000 in the first period. The first operating plan generation unit 230 may similarly use conditions in which a fourth condition of operating with the number of electrolytic apparatuses 1000 to operate and at the operating rate according to the maintenance plan is added to the first condition, the second condition, the third condition, and the like used by the second model generation unit 210 for generating the operating plan generation model. That is, the first operating plan generation unit 230 may generate an operating plan for reducing the hydrogen generation cost while satisfying the four conditions. It is desirable that the first operating plan generation unit 230 generate an operating plan that minimizes the hydrogen generation cost.

As described above, since the planning apparatus 100 of the third configuration example generates an operating plan in consideration of the maintenance plan generated by learning, it is possible to execute control of the electrolytic apparatus 1000 with higher accuracy. Note that the planning apparatus 100 of the third configuration example has been described with an example of obtaining prediction data predicting abnormality and deterioration of the electrolytic apparatus 1000 from the outside or the like. Instead of this, the planning apparatus 100 may predict abnormality and deterioration of the electrolytic apparatus 1000. Further, the planning apparatus 100 may predict abnormality and deterioration of the electrolytic apparatus 1000 by learning. Such a planning apparatus 100 will be described next.

Figure 5:
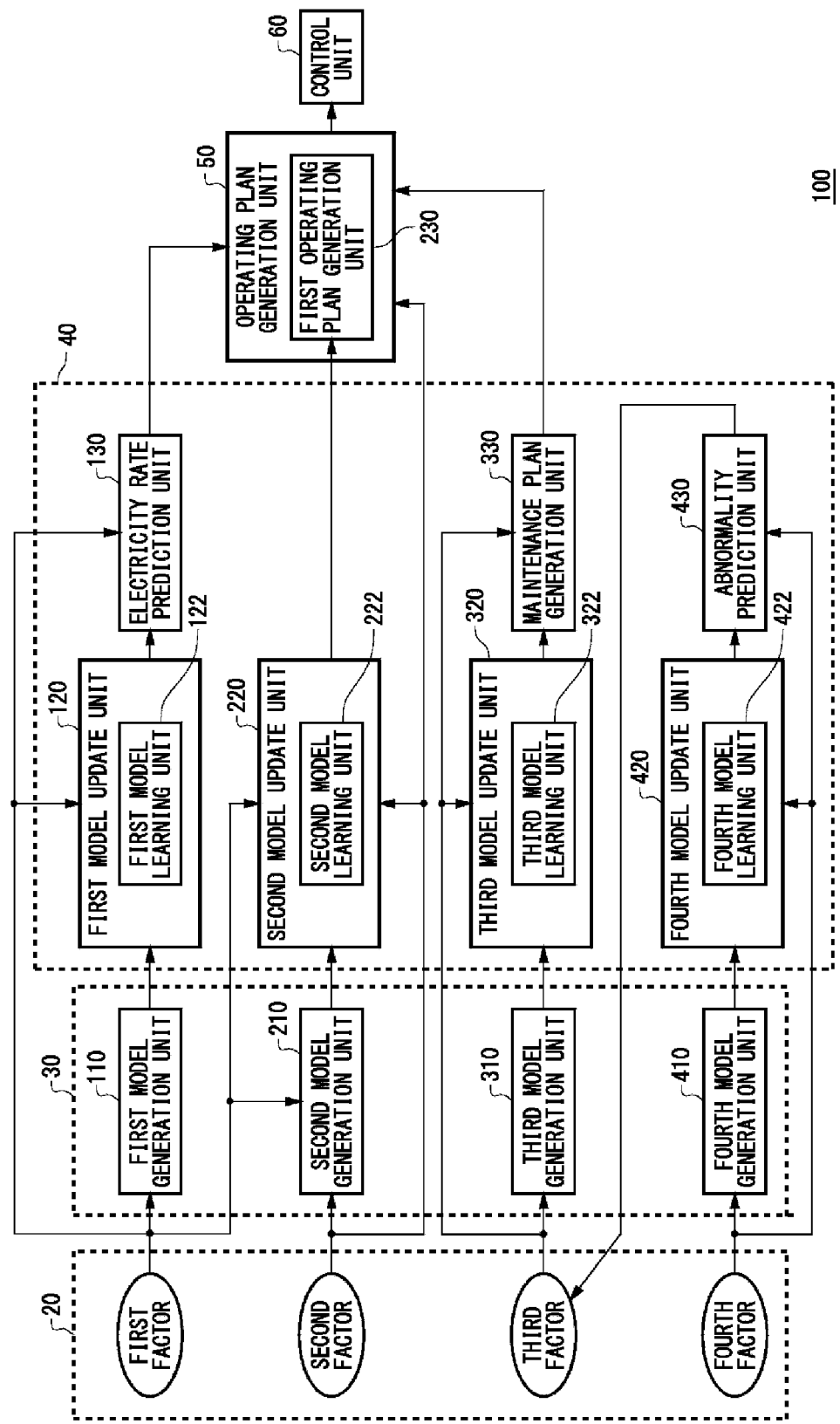
FIG. 5 illustrates a fourth configuration example of the planning apparatus 100 according to the present embodiment.

FIG. 5 illustrates a fourth configuration example of the planning apparatus 100 according to the present embodiment. In the planning apparatus 100 of the fourth configuration example, the same reference numerals are given to components substantially the same in operation as those of the planning apparatus 100 of the third configuration example illustrated in FIG. 4, and descriptions thereof will be omitted. Moreover, FIG. 5 illustrates a configuration in which the obtaining unit 10 of the planning apparatus 100 is omitted.

The planning apparatus 100 of the fourth configuration example includes a fourth model generation unit 410, a fourth model update unit 420, and an abnormality prediction unit 430, and predicts an abnormal operation and the like of the electrolytic apparatus 1000 in the future. In this case, the model generation unit 30 may include the fourth model generation unit 410, and the learning processing unit 40 may include the fourth model update unit 420 and the abnormality prediction unit 430.

In the storage unit 20 of the fourth configuration example, the obtaining unit 10 further obtains a fourth factor, and stores the fourth factor in the storage unit 20. The fourth factor includes an operating status of the electrolytic apparatus 1000 prior to a target period. The fourth factor may include histories of abnormality and deterioration and the like that occurred in the past of the electrolytic apparatus 1000. The fourth factor includes, for example, occurrence time of abnormality and degradation and the like, repair period, operating rate of the electrolytic apparatus 1000 before and after occurrence time of abnormality and degradation and the like, and contents of abnormality and degradation, and the like.

Further, the fourth factor may include information such as degrees of wear, fatigue, and deterioration of parts, and the like based on an inspection result and a maintenance result of the electrolytic apparatus 1000. Moreover, the fourth factor may include information of replacement time of parts recommended by parts makers, and information of usage time of parts or time elapsed after installing in the electrolytic apparatus 1000, and the like.

The fourth model generation unit 410 generates an abnormality prediction model based on a value of the fourth factor available before the target period. The fourth model generation unit 410 may generate the abnormality prediction model by a process called prior learning, offline learning, or the like using information before the target period. The fourth model generation unit 410 generates the abnormality prediction model by using, for example, regression analysis, Bayesian inference, a neural network, a Gaussian mixture model, a hidden Markov model, and the like. Note that the abnormality prediction model is a model that predicts an abnormality of the electrolytic apparatus 1000 in the target period based on a value of the fourth factor by learning.

As an example, the fourth model generation unit 410 may generate an abnormality prediction model in the operation of S320 described in FIG. 3. That is, the fourth model generation unit 410 generates an abnormality prediction model based on a value of the fourth factor in the second period. The fourth model generation unit 410 supplies the generated abnormality prediction model to the fourth model update unit 420 as a fourth model.

The fourth model update unit 420 updates the abnormality prediction model by learning based on a value of the fourth factor in a past period and an abnormality occurrence record after the past period. The fourth model update unit 420 has a fourth model learning unit 422, and updates the abnormality prediction model according to a learning result of the fourth model learning unit 422. The fourth model update unit 420 may update, for example, the abnormality prediction model learned by the fourth model learning unit 422 as a new abnormality prediction model every predetermined fourth update period. Instead of this, the fourth model update unit 420 may update the operating plan generation model in response to the fourth model learning unit 422 having learned a predetermined number of times.

The fourth model learning unit 422 may learn the abnormality prediction model by a process called adaptive learning, online learning, or the like. The fourth model learning unit 422 performs reinforcement learning of the abnormality prediction model using, for example, regression analysis, Bayesian inference, a neural network, a Gaussian mixture model, a hidden Markov model, and the like as an identification model. It is desirable that the fourth model learning unit 422 learn by further using information temporally after information of the fourth factor used by the fourth model generation unit 410 for generating the abnormality prediction model.

The fourth model learning unit 422 learns the abnormality prediction model using information of the fourth factor updated by actual operation of the electrolytic apparatus 1000. That is, the fourth model learning unit 422 learns the abnormality prediction model based on a value of the fourth factor in the past period and an abnormality occurrence record after the past period.

The fourth model learning unit 422 may perform learning of the abnormality prediction model in response to the information of the fourth factor being updated. The fourth model learning unit 422 performs learning one or more times during the fourth update period of the fourth model update unit 420. As an example, the fourth model update unit 420 may adaptively learn the abnormality prediction model in the operation of S330 described in FIG. 3 and update the abnormal prediction model in the operation of S340.

For example, after the initial update period described with reference to FIG. 3, the fourth model update unit 420 updates the abnormality prediction model every fourth update period. The fourth update period and the first update period may be different periods, or may be substantially the same period. As an example, the fourth update period is one day. The fourth model update unit 420 supplies the updated abnormality prediction model to the abnormality prediction unit 430.

The abnormality prediction unit 430 uses the updated abnormality prediction model to predict an abnormality of the electrolytic apparatus 1000 in the target period, and uses the abnormality prediction model to predict an abnormality in the first period. The abnormality prediction unit 430 predicts an abnormality of the electrolytic apparatus in the first period based on a value of the fourth factor including the abnormality prediction of the electrolytic apparatus 1000 in the first period.

The abnormality prediction unit 430 predicts, every predetermined period for example, an abnormality of the predetermined period in the future. The abnormality prediction unit 430 applies, for example, the information of the fourth factor in the period until a time immediately before a period for which the abnormality prediction is to be predicted to the abnormality prediction model, so as to predict an abnormality. As an example, the abnormality prediction unit 430 may predict an abnormality in the operation of S350 described in FIG. 3.

In this case, the abnormality prediction unit 430 applies values of the fourth factor for N days of the second period obtained by the obtaining unit 10 during the initial update period to the abnormality prediction model, so as to predict an abnormality for N days of the first period after the initial update period. The abnormality prediction unit 430 causes the storage unit 20 to store the generated abnormality prediction as a new third factor. Instead of this, the abnormality prediction unit 430 may supply the generated abnormality prediction to the third model generation unit and the third model update unit 320 as a new third factor.

Note that the supply of the third factor by the abnormality prediction unit 430 starts from the first period. Accordingly, in the second period and the third period before the first period, the planning apparatus 100 of the fourth configuration example may use as the third factor a prediction result of the abnormality prediction model before being updated that is output by the fourth model generation unit 410 and the fourth model learning unit 422 by learning. Further, in the second period and the third period, the planning apparatus 100 of the fourth configuration example may use an abnormality prediction generated by an operation other than learning as the initial value, similarly to the planning apparatus 100 of the third configuration example.

As described above, the planning apparatus 100 of the fourth configuration example can generate a maintenance plan based on an abnormal operation of the electrolytic apparatus 1000 predicted more accurately by learning. That is, the planning apparatus 100 predicts an abnormal operation, a failure, and the like by learning, and can generate a maintenance plan that allows performing maintenance in advance so that the operating state of the apparatus does not greatly fluctuate. Then, since the planning apparatus 100 of the fourth configuration example generates an operating plan in consideration of such a maintenance plan, it is possible to execute control of the electrolytic apparatus 1000 with higher accuracy and reduced cost.

As described above, it has been stated that the planning apparatus 100 according to the present embodiment generates an operating plan of the electrolytic apparatus 1000 by learning. Such a planning apparatus 100 may be combined with an operation of generating an operating plan by logic different from learning. For example, the planning apparatus 100 may improve in accuracy of an operating plan by learning according to the number or times and/or time of learning. In this case, the planning apparatus 100 may generate an operating plan by logic until the accuracy of the operating plan is improved. Such a planning apparatus 100 will be described next.

Figure 6:
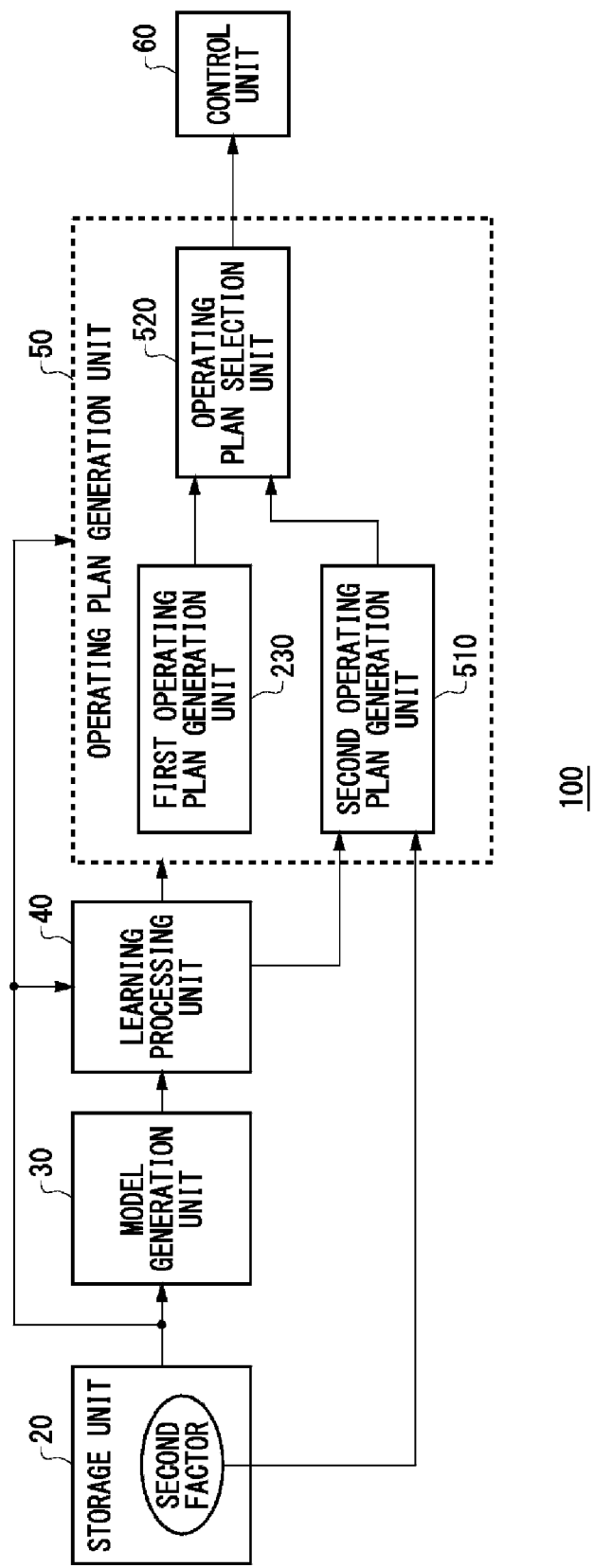
FIG. 6 illustrates a fifth configuration example of the planning apparatus 100 according to the present embodiment.

FIG. 6 illustrates a fifth configuration example of the planning apparatus 100 according to the present embodiment. In the planning apparatus 100 of the fifth configuration example, the same reference numerals are given to components substantially the same in operation as those of the planning apparatus 100 according to the present embodiment described in FIG. 1 to FIG. 5, and descriptions thereof will be omitted. The planning apparatus 100 of the fifth configuration example may be configured such that the operating plan generation unit 50 of the planning apparatus 100 that is any one of the planning apparatuses 100 of the first configuration example to the fourth configuration example further has a second operating plan generation unit 510 and an operating plan selection unit 520.

The second operating plan generation unit 510 generates, by a predetermined non-learning-based logic, an operating plan of the electrolytic apparatus 1000 in the first period based on a value of the second factor prior to the first period and a prediction result of the transition of the electricity rate in the first period. The second operating plan generation unit 510 may generate an operating plan in parallel with the first operating plan generation unit 230. The predetermined logic will be described later.

The operating plan selection unit 520 selects an operating plan generated by the second operating plan generation unit 510 when an operating plan generated by the first operating plan generation unit 230 does not satisfy predetermined constraints. For example, when a hydrogen generation cost in the first period according to the operating plan of the first operating plan generation unit 230 is more than a hydrogen generation cost in the first period by the second operating plan generation unit 510, the operating plan selection unit 520 selects an operating plan of the second operating plan generation unit 510.

In addition, the operating plan selection unit 520 may select the operating plan of the second operating plan generation unit 510 when the number of times of learning and/or learning time of the planning apparatus 100 is less than a predetermined threshold. In addition, the operating plan selection unit 520 may select the operating plan of the second operating plan generation unit 510 when the planning apparatus 100 stops operation of one or more electrolytic apparatuses 1000 out of a plurality of electrolytic apparatuses 1000 to perform maintenance.

As described above, the planning apparatus 100 of the fifth configuration example controls the electrolytic apparatus 1000 by employing an operating plan based on the logic when the learning is insufficient or the learning is difficult. Thus, the planning apparatus 100 can cause the electrolytic apparatus 1000 to stably operate even in the initial period and the maintenance execution period, so as to reduce the hydrogen generation cost. Next, the logic used by the second operating plan generation unit 510 of such an electrolytic apparatus 1000 will be described.

Figure 7:
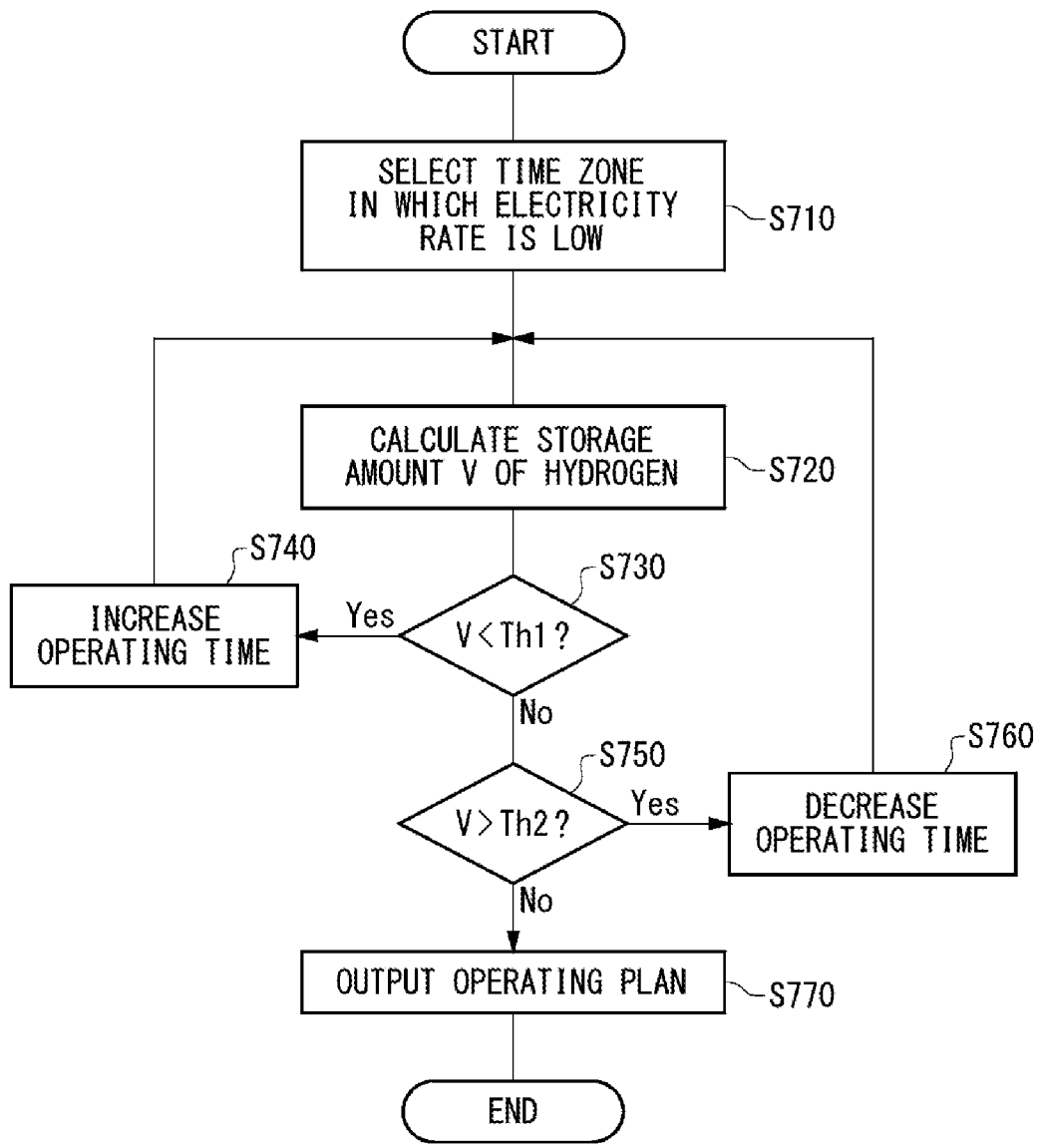
FIG. 7 illustrates an example of an operating flow of a second operating plan generation unit 510 according to the present embodiment.

FIG. 7 illustrates an example of an operating flow of the second operating plan generation unit 510 according to the present embodiment. The second operating plan generation unit 510 may execute the operating flow illustrated in FIG. 7 to generate an operating plan of the electrolytic apparatus 1000. In the present embodiment, an example will be described in which the second operating plan generation unit 510 generates an operating plan for the first period (N days).

The second operating plan generation unit 510 generates an operating plan which satisfies a use plan of a product of the electrolytic apparatus 1000 for the first period and causes the electrolytic apparatus 1000, in the first period, to operate in a period in which the electricity rate is predicted to be lower, with priority over a period in which the electricity rate is predicted to be higher. Therefore, first, the second operating plan generation unit 510 selects a time zone in which the electricity rate is low and hydrogen should be generated in the first period, based on a transition of the electricity rate in the first period (S710).

The second operating plan generation unit 510 selects a time zone in which hydrogen should be generated so that the amount of hydrogen generated and supplied by the electrolytic apparatus 1000 satisfies a predetermined supply plan. In addition, the supply plan may be a plan to supply hydrogen every predetermined period. For example, in the supply plan, the total number of times of supplying hydrogen in the first period and the amount of hydrogen to be supplied in every period Q are set. The period Q is a period shorter than the first period, and is one day for example.

Then, the second operating plan generation unit 510 further generates an operating plan to maintain the storage amount of the product within a reference range during the first period. For example, the second operating plan generation unit 510 calculates a transition of a storage amount V of hydrogen when the electrolytic apparatus 1000 is operated to generate hydrogen in the selected time zone, and hydrogen is supplied in every period Q, in the first period (S720). Next, the second operating plan generation unit 510 determines, for every period Q, whether the storage amount V of hydrogen falls below a predetermined threshold Th1 (S730).

The second operating plan generation unit 510 updates the operating plan of the electrolytic apparatus 1000 when the storage amount V of hydrogen is lower than the predetermined threshold Th1 (Yes in S730). For example, the second operating plan generation unit 510 increases, only for a predetermined fixed time, the operating time of the electrolytic apparatus 1000 in a period Q during which the storage amount V of hydrogen decreases (S740). The second operating plan generation unit 510 selects a time zone in which the electricity rate is low and increases the operating time. The second operating plan generation unit 510 returns to S720 and calculates a transition of the storage amount V of hydrogen according to the updated operating plan. The second operating plan generation unit 510 may repeat the operations of S720 to S740 until the hydrogen storage amount V no longer falls below the predetermined threshold Th1 in the first period (No in S730).

Next, the second operating plan generation unit 510 determines, for every period Q, whether the storage amount V of hydrogen exceeds a predetermined threshold Th2 (S750). The second operating plan generation unit 510 updates the operating plan of the electrolytic apparatus 1000 when the storage amount of hydrogen exceeds the predetermined threshold value Th2 (Yes in S750). The second operating plan generation unit 510 reduces, only for a predetermined fixed time, the operating time of the electrolytic apparatus 1000 in a period Q during which the storage amount V of hydrogen increases (S760). The second operating plan generation unit 510 selects a time zone in which the electricity rate is high and reduces the operating time.

The second operating plan generation unit 510 returns to S720 and calculates a transition of the storage amount V of hydrogen according to the updated operating plan. The second operating plan generation unit 510 may repeat the operations of S720 to S760 until the hydrogen storage amount V is maintained within the range of the predetermined thresholds Th1 and Th2 in the first period (No in S730, No in S750).

When the operating plan becomes one that can maintain the storage amount of hydrogen within the reference range, the second operating plan generation unit 510 may output this operating plan (S770). In addition, when the operating flow is looped without being able to output the operating plan even after a predetermined fixed period has elapsed, the second operating plan generation unit 510 may output an alert or the like of generation impossibility to the outside. In this case, the operating plan selection unit 520 may select the operating plan of the first operating plan generation unit 230. The second operating plan generation unit 510 may generate an operating plan of the next first period each time the first period elapses. As in the example above, the second operating plan generation unit 510 generates an operating plan of the electrolytic apparatus 1000 by using the predetermined non-learning-based logic.

The planning apparatus 100 according to the present embodiment as above has been described with an example in which the operating plan of the electrolytic apparatus 1000 is generated while predicting the electricity rate by learning. Instead of this, the planning apparatus 100 may generate an operating plan using a prediction result of an electricity rate supplied from the outside. Such a planning apparatus 100 will be described next.

Figure 8:
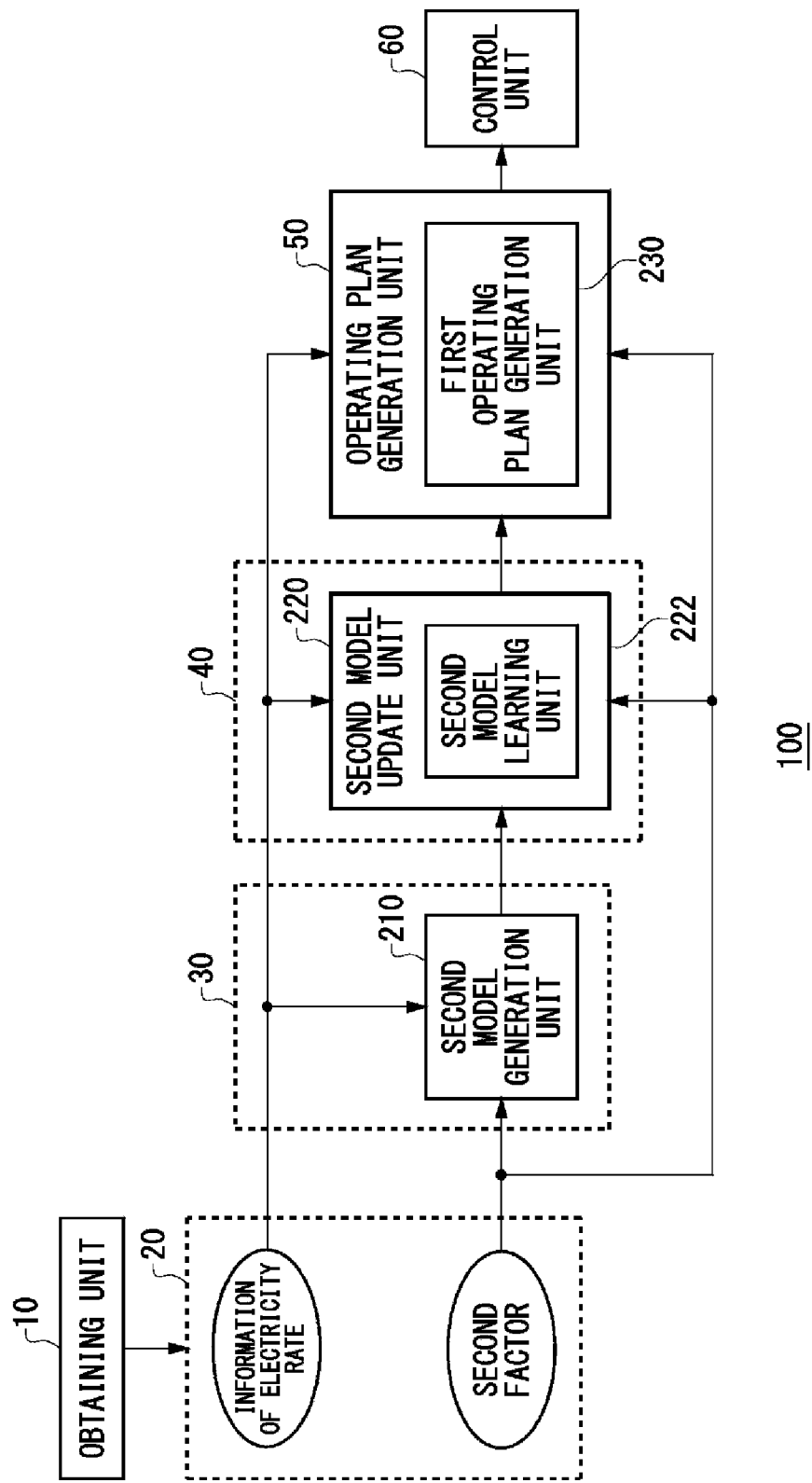
FIG. 8 illustrates a sixth configuration example of the planning apparatus 100 according to the present embodiment.

FIG. 8 illustrates a sixth configuration example of the planning apparatus 100 according to the present embodiment. In the planning apparatus 100 of the sixth configuration example, the same reference numerals are given to components substantially the same in operation as those of the planning apparatus 100 of the second configuration example illustrated in FIG. 2, and descriptions thereof will be omitted. In the planning apparatus 100 of the sixth configuration example, the obtaining unit 10 obtains information of electricity rates including a prediction result of electricity rates from the outside. Therefore, in the planning apparatus 100 of the sixth configuration example, the first model generation unit 110, the first model update unit 120, and the electricity rate prediction unit 130 may be omitted.

The second model generation unit 210 of the sixth configuration example may generate an operating plan generation model based on information of the electricity rate and a value of the second factor. Further, the second model update unit 220 updates the operating plan generation model by learning. Then, the operating plan generation unit 50 generates an operating plan of the electrolytic apparatus 1000 in the first period in the future based on a transition of a future electricity rate obtained from the outside. Thus, the control unit 60 can operate the electrolytic apparatus 1000 according to the operating plan generated by the operating plan generation unit 50.

Note that the planning apparatus 100 of the sixth configuration example is illustrated with an example in which the planning apparatus 100 of the second configuration example illustrated in FIG. 2 uses a prediction result of the electricity rate supplied from the outside, but is not limited thereto. The planning apparatus 100 of the sixth configuration example may be configured such that one of the planning apparatuses 100 of the third to fifth configuration examples illustrated in FIGS. 4 to 6 uses a prediction result of the electricity rate supplied from the outside. In this case, similarly to FIG. 8, the first model generation unit 110, the first model update unit 120, and the electricity rate prediction unit 130 may be omitted in the planning apparatus 100.

It has been stated that the planning apparatus 100 according to the present embodiment as above generates an operating plan of the electrolytic apparatus 1000 in the first period in the future based on a transition of the future electricity rate. Here, since a predicted value is used for the transition of the future electricity rate, the actual electricity rate may suddenly deviate greatly from the predicted value. In this case, even if the operating plan of the planning apparatus 100 is used, it is possible that the hydrogen production cost cannot be reduced. Accordingly, the control unit 60 may execute control of the electrolytic apparatus 1000 different from the operating plan in response to such a sudden fluctuation.

For example, in response to the electricity rate becoming lower than expected in a period in which the electrolytic apparatus 1000 is scheduled not to operate in the operating plan, the control unit 60 causes the electrolytic apparatus 1000 to operate in this period in order to avoid causing the electrolytic apparatus 1000 to operate at a higher electricity rate in the future. As an example, the control unit 60 causes the electrolytic apparatus 1000 to operate when the electricity rate becomes less than a predetermined first threshold in a period in which the electrolytic apparatus 1000 does not operate. In addition, the control unit 60 stops operation of the electrolytic apparatus 1000 or reduces the operating rate when the electricity rate exceeds a predetermined second threshold in a period in which the electrolytic apparatus 1000 operates.

Thus, the planning apparatus 100 can correct the operating plan in response to a sudden fluctuation in the electricity rate. Further, since the planning apparatus 100 according to the present embodiment generates the next operating plan by learning using an operating result of the electrolytic apparatus 1000, even if the control unit 60 executes control which deviates from the operating plan, the operating plan can be modified by learning and stable operations can be achieved throughout the whole period, and the production cost of hydrogen can be reduced.

It has been stated that the planning apparatus 100 according to the present embodiment as above generates an operating plan such that the amount of hydrogen generated and supplied by the electrolytic apparatus 1000 satisfies the predetermined supply plan. However, an actual supply amount of hydrogen of the electrolytic apparatus 1000 may be different from the supply plan. For example, the supply amount may be reduced more than in the supply plan due to a defect, a failure, a consumption adjustment, and the like of the supply destination of the electrolytic apparatus 1000. In this case, the storage amount of hydrogen in the electrolytic apparatus 1000 will increase more than expected. Accordingly, the control unit 60 may adjust operation of the electrolytic apparatus 1000 according to the storage amount of hydrogen of the electrolytic apparatus 1000.

For example, the control unit 60 stops operation of the electrolytic apparatus 1000 in response to the storage amount of a product of the electrolytic apparatus 1000 becoming equal to or more than an upper limit value during a period in which the electrolytic apparatus 1000 operates based on the operating plan. Thus, the control unit 60 can prevent the storage amount of hydrogen in the electrolytic apparatus 1000 from exceeding the upper limit.

In addition, for example, the supply amount of the electrolytic apparatus 1000 may increase more than in the supply plan. In this case, the storage amount of hydrogen in the electrolytic apparatus 1000 will decrease more than expected. Accordingly, the control unit 60 may adjust operation of the electrolytic apparatus 1000 according to the storage amount of hydrogen of the electrolytic apparatus 1000.

For example, the control unit 60 operates the electrolytic apparatus 1000 according to that the storage amount of the product of the electrolytic apparatus 1000 becomes equal to or less than a lower limit value during a period in which the electrolytic apparatus 1000 is stopped based on the operating plan. Thus, the control unit 60 can prevent the storage amount of hydrogen in the electrolytic apparatus 1000 from falling below the lower limit.

It has been stated that the planning apparatus 100 of the second configuration example to the sixth configuration example illustrated in FIGS. 2 to 8 as above generates an operating plan of the electrolytic apparatus 1000 in the first period in the future based on a transition of the future electricity rate. Here, the planning apparatus 100 may generate an operating plan of the electrolytic apparatus 1000 without anticipating the transition of the electricity rate. For example, the planning apparatus 100 may be configured as illustrated in FIG. 1 and may generate and learn a model that generates an operating plan based on all the factors obtained by the obtaining unit 10.

In this case, the obtaining unit 10 obtains learning data including an ideal operating plan of the electrolytic apparatus in a target period and values of factors available before the target period. The available factors may include the first factor and the second factor. In addition to this, the third factor may be available, or the third and fourth factors may be available.

Further, the model generation unit 30 generates an operating plan generation model that generates an operating plan in a target period based on factors available before the target period. The operating plan generation model in this case may generate an operating plan based on the first factor and the second factor. Note that the operating plan generation model in this case may be a model in which the first model and the second model are integrated.

Alternatively, the operating plan generation model may generate an operating plan based on the first to third factors. Note that the operating plan generation model in this case may be a model in which the first to third models are integrated. Alternatively, the operating plan generation model may generate an operating plan based on the first to fourth factors. Note that the operating plan generation model in this case may be a model in which the first to fourth models are integrated. The operating plan generation model may be generated by prior learning.

Further, the learning processing unit 40 learns the operating plan generation model based on obtained learning data. The learning processing unit 40 may learn the operating plan generation model by adaptive learning. In addition, the learning processing unit 40 may update the operating plan generation model every predetermined period.

In addition, the operating plan generation unit 50 uses the operating plan generation model to generate, based on a value of a factor before the first period, an operating plan including whether to cause the electrolytic apparatus 1000 to operate at each time point in the first period. As described above, the planning apparatus 100 of the first configuration example generates a model for generating the operating plan as one model in consideration of a transition of the electricity rate, and updates the model by learning, so that an operating plan with high accuracy can be output. Thereby, the control unit 60 can control electrolytic apparatus 1000 according to the operating plan.

With the planning apparatus 100 according to the present embodiment as above, since the operating plan of the electrolytic apparatus 1000 is generated by learning, it is possible to prevent or reduce occurrence of insufficiency of the hydrogen production amount, generation of hydrogen in a time zone in which the electricity rate is high, and the like. Further, since the planning apparatus 100 generates the operating plan of the electrolytic apparatus 1000 while predicting the electricity rate, it is possible to generate a more accurate operating plan.

Figure 9:
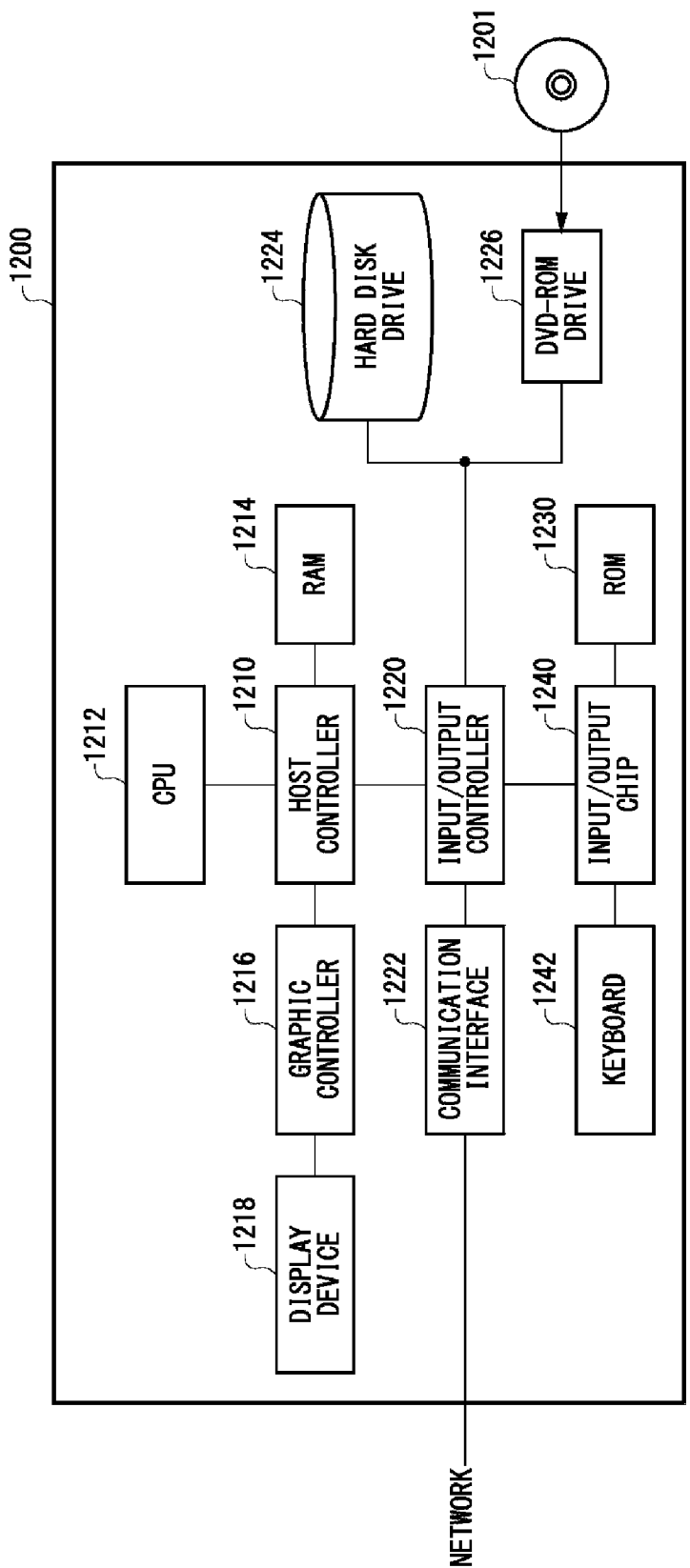
FIG. 9 illustrates an example of a computer 1200 in which aspects of the present invention may be fully or partially embodied.

FIG. 9 illustrates an example of a computer 1200 in which a plurality of aspects of the present invention may be fully or partially embodied. A program installed in the computer 1200 can cause the computer 1200 to function as an operation associated with an apparatus according to embodiments of the present invention or as one or more "units" of the apparatus, or to execute the operation or the one or more "units" and/or can cause the computer 1200 to execute processes according to the embodiments of the present invention or steps of the processes. Such a program may be executed by a CPU 1212 to cause the computer 1200 to execute specific operations associated with some or all of the blocks in the flowcharts and the block diagrams described herein.

The computer 1200 according to the present embodiment includes a CPU 1212, a RAM 1214, a graphic controller 1216, and a display device 1218, which are mutually connected by a host controller 1210. The computer 1200 also includes input/output units such as a communication interface 1222, a hard disk drive 1224, a DVD-ROM drive 1226, and an IC card drive, which are connected to a host controller 1210 via an input/output controller 1220. The computer also includes legacy input/output units, such as a ROM 1230 and a keyboard 1242, which are connected to the input/output controller 1220 via an input/output chip 1240.

The CPU 1212 operates in accordance with programs stored in the ROM 1230 and the RAM 1214 to thereby control each unit. The graphic controller 1216 obtains image data generated by the CPU 1212 in a frame buffer or the like provided in the RAM 1214 or the graphic controller 1216 itself, and displays the image data on the display device 1218.

The communication interface 1222 communicates with other electronic devices via a network. Hard disk drive 1224 stores programs and data used by the CPU 1212 in the computer 1200. The DVD-ROM drive 1226 reads a program or data from a DVD-ROM 1201 and provides the hard disk drive 1224 with the program or data via the RAM 1214. The IC card drive reads programs and data from an IC card and/or writes programs and data to the IC card.

The ROM 1230 internally stores a boot program or the like executed by the computer 1200 upon activation, and/or a program dependent on hardware of the computer 1200. The input/output chip 1240 may also connect various input/output units to the input/output controller 1220 via a parallel port, a serial port, a keyboard port, a mouse port, and the like.

The program is provided by a computer readable storage medium such as a DVD-ROM 1201 or an IC card. The program is read from a computer readable storage medium, installed in a hard disk drive 1224, a RAM 1214, or a ROM 1230, which is also an example of a computer readable storage medium, and executed by the CPU 1212. Information processing described in these programs is read by the computer 1200 and provides coordination between the programs and the various types of hardware resources described above. An apparatus or method may be configured by implementing an operation or processing of information in accordance with use of the computer 1200.

For example, when communication is carried out between the computer 1200 and an external device, the CPU 1212 may execute a communication program loaded in the RAM 1214, and command communication processing to the communication interface 1222 based on processing described in the communication program. Under control of the CPU 1212, the communication interface 1222 reads transmission data stored in a transmission buffer area provided in a recording medium such as the RAM 1214, the hard disk drive 1224, the DVD-ROM 1201, or the IC card, and transmits the read transmission data to the network or writes reception data received from the network to a reception buffer area or the like provided on the recording medium.

In addition, the CPU 1212 may read all or necessary portions of files or databases stored in an external recording medium such as the hard disk drive 1224, the DVD-ROM drive 1226 (DVD-ROM 1201), the IC card, and the like into the RAM 1214, and may execute various types of processing on data on the RAM 1214. The CPU 1212 may then write back the processed data to the external storage medium.

Various types of information, such as various types of programs, data, tables, and databases, may be stored in the recording medium to be information-processed. The CPU 1212 may execute various types of processing on data read from the RAM 1214, including various types of operations, information processing, condition judgment, conditional branching, unconditional branching, information retrieval/replacement, and the like, which are described throughout the present disclosure and specified by a program instruction sequence, and writes back results to the RAM 1214. Further, the CPU 1212 may search for information in files, databases, and the like in a recording medium. For example, when a plurality of entries each having an attribute value of a first attribute associated with an attribute value of a second attribute are stored in a recording medium, the CPU 1212 may search the plurality of entries for an entry matching a condition for which the attribute value of the first attribute is specified, read the attribute value of the second attribute stored in the entry, and thereby obtain the attribute value of the second attribute associated with the first attribute satisfying a predetermined condition.

The program or software module according to the above description may be stored in a computer readable storage medium on the computer 1200 or near the computer 1200. Further, a recording medium such as a hard disk or a RAM provided in a server system connected to a dedicated communication network or the Internet can be used as a computer readable storage medium, by which the program can be provided to the computer 1200 via the network.

As described above, although the present invention has been described using embodiments, the technical scope of the present invention is not limited to the ranges described in the embodiments. It is apparent to those skilled in the art that various changes or modifications can be added to the above embodiments. It is apparent from the scope of the claims that embodiments to which such alterations or improvements are added can also be included in the technical scope of the present invention.

It should be noted that the order of execution of each process of operations, procedures, steps, phases, and the like in the apparatuses, systems, programs, and methods illustrated in the claims, the description, and the drawings can be implemented in any order as long as not particularly described as "before", "prior to", or the like, and unless an output of a previous process is used in a later process. With regard to the operating flows in the claims, the description, and the drawings, even if they are described using "first", "next", and the like for convenience, it does not mean that they must be carried out in this order.

What is claimed is:

1. A planning apparatus comprising:
   at least one processor;
   an electricity rate prediction unit configured to predict a transition of a future electricity rate by using an electricity rate prediction model that predicts a transition of an electricity rate in a target period based on a value of a first factor available before the target period using the at least one processor;
   an operating plan generation unit configured to generate an operating plan of an electrolytic apparatus in a first period in a future based on the predicted transition of the future electricity rate using the at least one processor; and
   a first model update unit configured to update the electricity rate prediction model by learning based on a value of the first factor in a past period and an actual transition of an electricity rate after the past period using the at least one processor; and
   a control unit configured to perform control of operating the electrolytic apparatus by using the operating plan of the electrolytic apparatus in the first period using the at least one processor,
   wherein the electricity rate prediction model predicts the transition of the electricity rate in the target period based on a value of the first factor including at least one of an electricity rate, a power demand amount, a power supply amount, a regenerated energy generation amount, a predicted value of the regenerated energy generation amount, and weather information before the target period.

2. The planning apparatus according to claim 1, wherein the operating plan generation unit comprises a first operating plan generation unit configured to generate the operating plan of the electrolytic apparatus in the first period in the future by using an operating plan generation model that generates an operating plan in the target period based on a value of a second factor available before the target period and a prediction result of the transition of the electricity rate in the target period using the at least one processor.

3. The planning apparatus according to claim 2 wherein the operating plan generation model is configured to generate an operating plan of the electrolytic apparatus in the target period based on a value of the second factor including at least one of operating data of the electrolytic apparatus and a hydrogen storage amount of the electrolytic apparatus before the target period, and on the prediction result of the transition of the electricity rate in the target period using the at least one processor.

4. The planning apparatus according to claim 2, further comprising a second model update unit configured to update the operating plan generation model by learning based on a value of the second factor in a past period, a transition of an electricity rate or a prediction result of the transition of the electricity rate after the past period, and a previous operating plan of the electrolytic apparatus after the past period using the at least one processor.

5. The planning apparatus according to claim 2, wherein the operating plan generation unit further includes:
   a second operating plan generation unit configured to generate, by a predetermined non-learning-based logic, the operating plan of the electrolytic apparatus in the first period based on a value of the second factor before the first period and a prediction result of a transition of an electricity rate in the first period using the at least one processor; and an operating plan selection unit configured to select the operating plan generated by the second operating plan generation unit when the operating plan generated by the first operating plan generation unit does not satisfy a predetermined constraint using the at least one processor.

6. The planning apparatus according to claim 5, wherein the second operating plan generation unit is configured to generate an operating plan which satisfies a use plan of a product of the electrolytic apparatus for the first period and causes the electrolytic apparatus, in the first period, to operate in a period in which the electricity rate is predicted to be lower, with priority over a period in which the electricity rate is predicted to be higher using the at least one processor.

7. The planning apparatus according to claim 6, wherein the second operating plan generation unit is configured to generate an operating plan to maintain a storage amount of the product within a reference range during the first period using the at least one processor.

8. The planning apparatus according to claim 2, wherein the first operating plan generation unit is configured to generate the operating plan of the electrolytic apparatus in the first period by using, among a plurality of operating plan generation models respectively corresponding to every number of apparatuses that operate among a plurality of the electrolytic apparatuses or every combination of the plurality of electrolytic apparatuses, an operating plan generation model according to an operating schedule of the plurality of electrolytic apparatuses in the first period using the at least one processor.

9. The planning apparatus according to claim 1, wherein the operating plan generation unit is configured to generate the operating plan of the electrolytic apparatus in the first period further based on a maintenance plan of the electrolytic apparatus in the first period using the at least one processor.

10. The planning apparatus according to claim 9, further comprising:

a maintenance plan generation unit configured to generate a maintenance plan of the electrolytic apparatus in the first period in the future, by using a maintenance plan generation model that generates a maintenance plan in the target period based on a value of a third factor available before the target period using the at least one processor; and a third model update unit configured to update the maintenance plan generation model by learning based on a value of the third factor in a past period and a previous maintenance plan of the electrolytic apparatus after the past period using the at least one processor.

11. The planning apparatus according to claim 10, wherein the maintenance plan generation unit is configured to generate a maintenance plan of the electrolytic apparatus in the first period based on a value of the third factor including an abnormality prediction of the electrolytic apparatus in the first period using the at least one processor.

12. The planning apparatus according to claim 11, further comprising:

an abnormality prediction unit configured to predict an abnormality in the first period by using an abnormality prediction model that predicts an abnormality of the electrolytic apparatus in the target period based on a value of a fourth factor available before the target period, wherein the abnormality prediction model predicts an abnormality in the target period based on a value of the fourth factor including an operating status of the electrolytic apparatus before the target period using the at least one processor; and a fourth model update unit configured to update the abnormality prediction model by learning based on a value of the fourth factor in a past period and an abnormality occurrence record after the past period using the at least one processor.

13. A method of generating an operating plan of an electrolytic apparatus performed by at least one processor, comprising:

predicting a transition of a future electricity rate by using an electricity rate prediction model that predicts a transition of an electricity rate in a target period based on a value of a first factor available before the target period using the at least one processor;

generating an operating plan of an electrolytic apparatus in a first period in a future based on a predicted transition of the future electricity rate using the at least one processor;

updating the electricity rate prediction model by learning based on a value of the first factor in a past period and an actual transition of an electricity rate after the past period using the at least one processor; and controlling the electrolytic apparatus by using the operating plan of the electrolytic apparatus in the first period using the at least one processor, wherein the electricity rate prediction model predicts the transition of the electricity rate in the target period based on a value of the first factor including at least one of an electricity rate, a power demand amount, a power supply amount, a regenerated energy generation amount, a predicted value of the regenerated energy generation amount, and weather information before the target period.

14. A non-transitory computer readable storage medium that stores a program, which when executed by at least one processor of a computer, causes the computer to perform operations comprising:

predicting a transition of a future electricity rate by using an electricity rate prediction model that predicts a transition of an electricity rate in a target period based on a value of a first factor available before the target period using the at least one processor;

generating an operating plan of an electrolytic apparatus in a first period in a future based on a predicted transition of the future electricity rate using the at least one processor;

updating the electricity rate prediction model by learning based on a value of the first factor in a past period and an actual transition of an electricity rate after the past period using the at least one processor; and controlling the electrolytic apparatus by using the operating plan of the electrolytic apparatus in the first period using the at least one processor, wherein the electricity rate prediction model predicts the transition of the electricity rate in the target period based on a value of the first factor including at least one of an electricity rate, a power demand amount, a power supply amount, a regenerated energy generation amount, a predicted value of the regenerated energy generation amount, and weather information before the target period.

15. The non-transitory computer readable storage medium according to claim 14, wherein the operations comprises updating the operating plan generation model by learning based on a value of a second factor in a past period, a transition of an electricity rate or a prediction result of the transition of the electricity rate after the past period, and a previous operating plan of the electrolytic apparatus after the past period using the at least one processor.

16. The non-transitory computer readable storage medium according to claim 14, wherein the operations comprises generating the operating plan of the electrolytic apparatus in the first period by using, among a plurality of operating plan generation models respectively corresponding to every number of apparatuses that operate among a plurality of the electrolytic apparatuses or every combination of the plurality of electrolytic apparatuses, an operating plan generation model according to an operating schedule of the plurality of electrolytic apparatuses in the first period using the at least one processor.

17. The non-transitory computer readable storage medium according to claim 14, wherein the operations further comprises:
generating a maintenance plan of the electrolytic apparatus in the first period in the future, by using a maintenance plan generation model that generates a maintenance plan in the target period based on a value of a third factor available before the target period using the at least one processor; and
updating the maintenance plan generation model by learning based on a value of the third factor in a past period and a ideal maintenance plan of the electrolytic apparatus after the past period using the at least one processor.

18. The non-transitory computer readable storage medium according to claim 17, wherein the operations further comprises generating a maintenance plan of the electrolytic apparatus in the first period based on a value of the third factor including an abnormality prediction of the electrolytic apparatus in the first period using the at least one processor.

19. The non-transitory computer readable storage medium according to claim 18, wherein the operations further comprises:
predicting an abnormality in the first period by using an abnormality prediction model that predicts an abnormality of the electrolytic apparatus in the target period based on a value of a fourth factor available before the target period, wherein the abnormality prediction model predicts an abnormality in the target period based on a value of the fourth factor including an operating status of the electrolytic apparatus before the target period using the at least one processor; and
updating the abnormality prediction model by learning based on a value of the fourth factor in a past period and an abnormality occurrence record after the past period using the at least one processor.

\* \* \* \* \*